US011653413B2

(12) United States Patent
Tang et al.

(10) Patent No.: US 11,653,413 B2
(45) Date of Patent: May 16, 2023

(54) SECONDARY CELL ACTIVATION IN NEW RADIO SYSTEM

(71) Applicant: MediaTek Singapore Pte. Ltd., Singapore (SG)

(72) Inventors: Zhixun Tang, Beijing (CN); Tsang-Wei Yu, Hsinchu (TW); Hsuan-Li Lin, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 155 days.

(21) Appl. No.: 17/172,705

(22) Filed: Feb. 10, 2021

(65) Prior Publication Data
US 2021/0251040 A1  Aug. 12, 2021

Related U.S. Application Data

(63) Continuation of application No. PCT/CN2020/074874, filed on Feb. 12, 2020.

(30) Foreign Application Priority Data

Feb. 2, 2021 (CN) .......................... 202110142753.6

(51) Int. Cl.
H04W 72/04 (2009.01)
H04W 80/02 (2009.01)
(Continued)

(52) U.S. Cl.
CPC .......... *H04W 80/02* (2013.01); *H04B 7/0626* (2013.01); *H04B 17/318* (2015.01);
(Continued)

(58) Field of Classification Search
CPC ..... H04W 80/02; H04W 24/10; H04W 52/52; H04W 56/001; H04W 76/27;
(Continued)

(56) References Cited

U.S. PATENT DOCUMENTS 10,912,023 B2 * 2/2021 Kazmi ............... H04J 11/00
2021/0167928 A1 * 6/2021 Xiao ............... H04W 72/0453
(Continued)

OTHER PUBLICATIONS

R4-1915058, Ericsson, On activation of multiple SCells, 3GPP TSG RAN WG4 Meeting #93, Nov. 18-22, 2019 (Year: 2019).*
(Continued)

*Primary Examiner* — Mahbubul Bar Chowdhury
(74) *Attorney, Agent, or Firm* — Oblon, McClelland, Maier & Neustadt, L.L.P.

(57) ABSTRACT

A method of activating multiple secondary cells can include receiving on a primary cell (PCell) at a user equipment (UE) a first medium access (MAC) control element (CE) for activating a first secondary cell (SCell) and a second SCell for the UE in a wireless communication system. The first and second SCells can operate in a same band. No active serving cell operates on the same band for the UE. In response to that the first SCell is a known SCell, the second SCell is an unknown SCell, and both the first and second SCells operate in the same band that is a frequency range 2 (FR2) band, the first and second SCells can be activated in parallel without
(Continued)

performing cell search and reference signal received power (RSRP) measurement and reporting over the first and second SCells.

16 Claims, 10 Drawing Sheets

(51) Int. Cl.
| | |
|---|---|
| H04B 17/318 | (2015.01) |
| H04W 76/27 | (2018.01) |
| H04B 7/06 | (2006.01) |
| H04L 1/1812 | (2023.01) |
| H04L 5/00 | (2006.01) |
| H04W 24/10 | (2009.01) |
| H04W 52/52 | (2009.01) |
| H04W 56/00 | (2009.01) |

(52) U.S. Cl.
CPC .......... *H04L 1/1819* (2013.01); *H04L 5/0055* (2013.01); *H04W 24/10* (2013.01); *H04W 52/52* (2013.01); *H04W 56/001* (2013.01); *H04W 76/27* (2018.02)

(58) Field of Classification Search
CPC ... H04B 7/0626; H04B 17/318; H04L 1/1819; H04L 5/0055; H04L 5/0053; H04L 5/0098
See application file for complete search history.

(56) References Cited

U.S. PATENT DOCUMENTS

| | | | | |
|---|---|---|---|---|
| 2021/0242987 | A1* | 8/2021 | Kazmi | H04L 5/0048 |
| 2021/0266134 | A1* | 8/2021 | Axmon | H04L 5/0092 |
| 2021/0321405 | A1* | 10/2021 | Cui | H04L 5/0048 |
| 2022/0078801 | A1* | 3/2022 | Huang | H04W 76/15 |
| 2022/0167359 | A1* | 5/2022 | Miao | H04W 72/085 |
| 2022/0174686 | A1* | 6/2022 | Xiao | H04L 5/001 |

OTHER PUBLICATIONS

R4-1910040, NEC, Draft CR to 38.133: SCell activation delay requirements on FR2 band, 3GPP TSG-RAN4 Meeting # 92, Aug. 26-Aug. 30, 2019 (Year: 2019).*

Extended European Search Report dated Jun. 9, 2021 in European Patent Application No. 21156770.6, 7 pages.

Ericsson, "On activation of multiple S Cells", 3GPP TSG RAN WG4 Meeting #93. Nov. 18-22, 2019, R4-1915058, XP051819323, 6 pages.

MediaTek, Inc., "Discussion on NR fast Scell Activation", 3GPP TSG-RAN WG4 Meeting #92bis, R4-1910918, Oct. 14-18, 2019, XP051805821, 13 pages.

Combined Taiwanese Office Action and Search Report dated Nov. 10, 2021 in Taiwanese Patent Application No. 110105012 (with English translation of Category of Cited Documents), 9 pages.

* cited by examiner

SECONDARY CELL ACTIVATION IN NEW RADIO SYSTEM

INCORPORATION BY REFERENCE

This present application claims the benefit of Chinese Application No. 202110142753.6, filed on Feb. 2, 2021, which claims the benefit of International Application No. PCT/CN2020/074874, "Methods and Apparatus of SCell Activation in New Radio System" filed on Feb. 12, 2020. The disclosures of both the prior applications are incorporated herein by reference in their entirety.

TECHNICAL FIELD

The present disclosure relates to wireless communications, and specifically relates to new radio (NR) communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A device capable of carrier aggregation may receive or transmit simultaneously on multiple component carriers in order to increase an overall data rate. The device can thus operate in multiple cells transmitted from a same base station. The multiple cells can include a primary cell and one or more secondary cells. The secondary cells can be activated or deactivated dynamically to adapt to data bursts between the device and the base station. In this way, a high data throughput can be achieved while a low power consumption can be maintained for the device.

SUMMARY

Aspects of the disclosure provide a method of activating multiple secondary cells. The method can include receiving on a primary cell (PCell) at a user equipment (UE) a first medium access (MAC) control element (CE) for activating a first secondary cell (SCell) and a second SCell for the UE in a wireless communication system. The first and second SCells can operate in a same band. No active serving cell operates on the same band for the UE. In response to that the first SCell is a known SCell, the second SCell is an unknown SCell, and both the first and second SCells operate in the same band that is a frequency range 2 (FR2) band, the first and second SCells can be activated in parallel without performing cell search and reference signal received power (RSRP) measurement and reporting over the first and second SCells.

In an embodiment, the activating the first and second SCells in parallel includes receiving on the PCell a second MAC CE for indicating a first transmission configuration indication (TCI) state for receiving one of a physical downlink control channel (PDCCH) or a physical downlink shared channel (PDSCH) of the second SCell, performing a time-frequency tracking process on the second SCell based on an SSB indicated in the first TCI state, receiving a third MAC CE on the PCell for activating a semi-persistent (SP) channel state information reference signal (CSI-RS) resource set of the second SCell, and performing a channel state information (CSI) reporting process based on the SP CSI-RS resource set activated by the third MAC CE on the second SCell.

In an embodiment, the first MAC CE for activating the first and second SCells is received in slot n, and a CSI report of the CSI reporting process is transmitted no later than in slot $$n + \frac{T_{HARQ} + T_{activation\_time} + T_{CSI\_reporting}}{\text{New Radio (NR) slot length}},$$

where:

$T_{HARQ}$ denotes a delay between a downlink data transmission associated with the first MAC CE and a corresponding hybrid automatic repeat request (HARQ) acknowledgement, $T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and $T_{activation\_time}$ denotes an activation delay that is $T_{MAC\_CE} + \max(T_{uncertainty\_MAC} + T_{FineTime} + T_{SSB}, T_{uncertainty\_SP})$, where, $T_{MAC\_CE}$ denotes a delay including MAC CE parsing and applying time, $T_{uncertainty\_MAC}$ denotes a period between a reception of the first MAC CE and a reception of a last one of the second MAC CE and a fourth MAC CE for indicating a TCI state for receiving the other one of the PDCCH and the PDSCH of the SCell, $T_{FineTime}$ denotes a period between the UE completing processing of the last one of the second MAC CE and the fourth MAC CE, and a timing of the SSB indicated in the first TCI state, $T_{SSB}$ denotes a period for processing a received signal of the SSB indicated in the first TCI state, and $T_{uncertainty\_SP}$ denotes a period between the reception of the first MAC CE and a reception of the third MAC CE.

In an embodiment, wherein $T_{activation\_time}$ is 3 ms+max $(T_{uncertainty\_MAC} + T_{FineTime} + 2$ ms, $T_{uncertainty\_SP})$.

In an embodiment, the activating the first and second SCells in parallel includes receiving on the PCell a second MAC CE for indicating a first TCI state for receiving one of a PDCCH or a PDSCH of the second SCell, performing a time-frequency tracking process on the second SCell based on an SSB indicated in the first TCI state, receiving on the PCell a radio resource control (RRC) message for configuring periodic CSI-RS of the second SCell, and performing a CSI reporting process based on the periodic SP CSI-RS configured by the RRC message on the second SCell.

In an embodiment, the first MAC CE for activating the SCell is received in slot n, and a CSI report of the CSI reporting process is transmitted no later than in slot $$n + \frac{T_{HARQ} + T_{activation\_time} + T_{CSI\_reporting}}{\text{New Radio (NR) slot length}},$$

where:

$T_{HARQ}$ denotes a delay between a downlink data transmission associated with the first MAC CE and a corresponding HARQ acknowledgement, $T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and $T_{activation\_time}$ denotes an activation delay that is $$\max(T_{MAC\_CE}+T_{uncertainty\_MAC}+T_{FineTime}+T_{SSB},$$
$$T_{uncertainty\_RRC}+T_{RRC\_delay}-T_{HARQ}),$$

where, $T_{MAC\_CE}$ denotes a delay including MAC CE parsing and applying time, $T_{uncertainty\_MAC}$ denotes a period between a reception of the first MAC CE and a reception of a last one of the second MAC CE and a fourth MAC CE for indicating a TCI state for receiving the other one of the PDCCH and the PDSCH of the SCell, $T_{FineTime}$ denotes a period between the UE completing processing of the last one of the second MAC CE and the fourth MAC CE, and a timing of the SSB indicated in the first TCI state, $T_{SSB}$ denotes a period for processing a received signal of the SSB indicated in the first TCI state, $T_{uncertainty\_RRC}$ denotes a period between the reception of the first MAC CE and a reception of the RRC message, and $T_{RRC\_delay}$ denotes a period for processing the RRC message.

In an example, for the RRC signaling, $T_{activation\_time}$ is $\max(T_{uncertainty\_MAC}+5 \text{ ms}+T_{FineTime}, T_{uncertainty\_RRC}+T_{RCC\_delay}-T_{HARQ})$.

In an embodiment, the method can further include in response to that both the first and second SCells are unknown SCells and operate in the same band that is an FR2 band, performing a cell search on the first SCell, transmitting an RSRP measurement report indicating RSRP measurements associated with an SSB of the first SCell, and activating the second SCell without performing cell search and RSRP measurement and reporting over the second SCell.

In an embodiment, the method can further include in response to that the first SCell is a known SCell, the second SCell is an unknown SCell, and both the first and second SCells operate in the same band that is a frequency range 1 (FR1) band, activating the first and second SCells in parallel without performing automatic gain control (AGC) gain settling and cell search over the first and second SCells. In an embodiment, the PCell is a primary cell of a primary cell group (PCG), or a primary cell of a secondary cell group (SCG).

Aspects of the disclosure provide an apparatus. The apparatus can include circuitry configured to receive on a PCell at a UE a MAC CE for activating a first SCell and a second SCell for the UE in a wireless communication system. The first and second SCells operating in a same band, and no active serving cell operates on the same band for the UE. The circuitry can further be configured to, in response to that the first SCell is a known SCell, the second SCell is an unknown SCell, and both the first and second SCells operate in the same band that is a frequency range 2 (FR2) band, activate the first and second SCells in parallel without performing cell search and reference signal received power (RSRP) measurement and reporting over the first and second SCells.

Aspects of the disclosure provide a non-transitory computer-readable medium storing instructions that, when executed by a processor, cause the processor to perform the method of activating multiple secondary cells.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
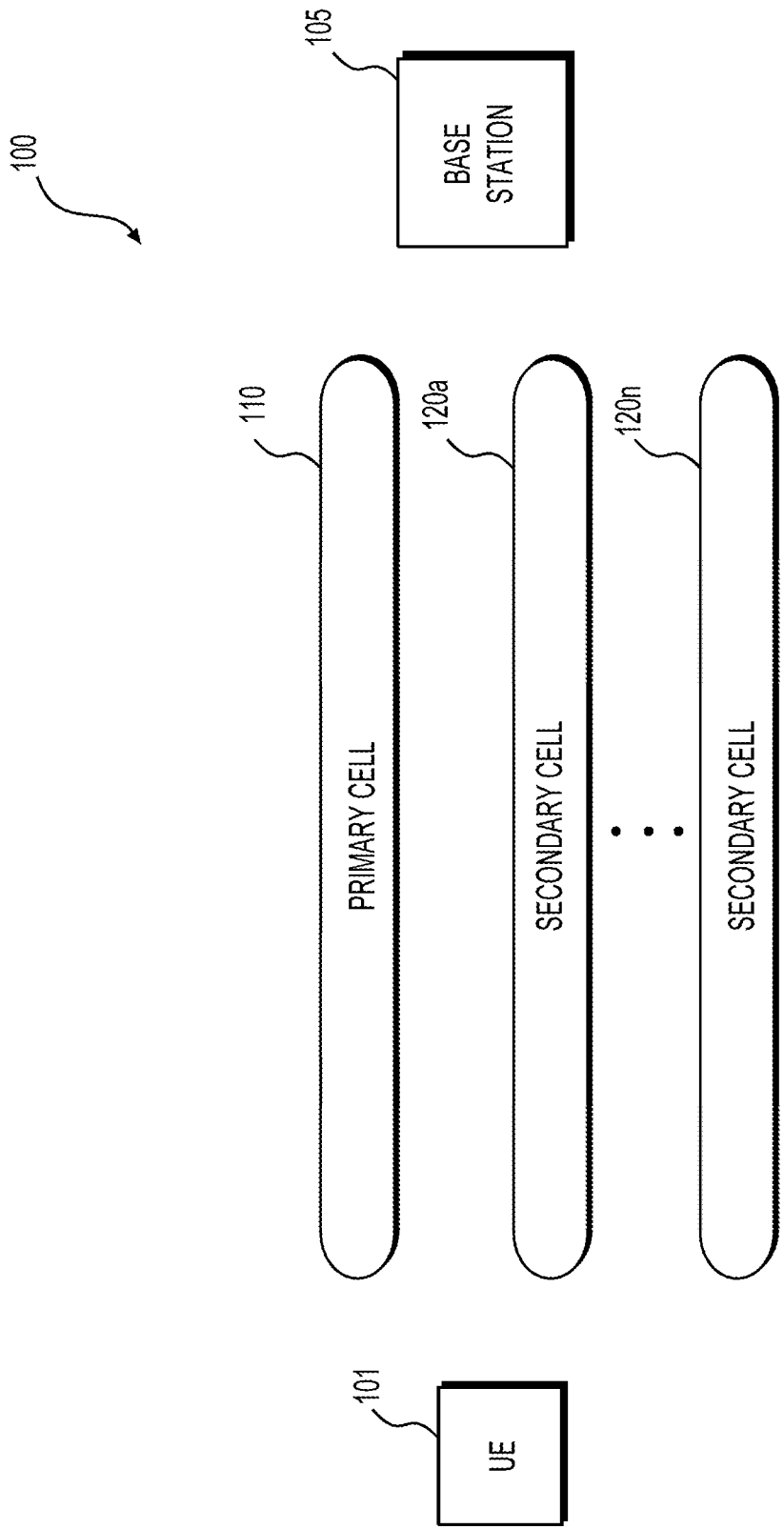
FIG. 1 shows a wireless communication system 100 according to an embodiment of the disclosure.

FIG. 1 shows a wireless communication system 100 according to an embodiment of the disclosure. The system 100 can include a user equipment (UE) 101 and a base station 105. The wireless communication system 100 can be a cellular network. The UE 101 can be a mobile phone, a laptop computer, a tablet computer, and the like. The base station 105 can be an implementation of a gNB in New Radio (NR) of a fifth generation (5G) system. The 5G NR is a radio interface specified in communication standards developed by the 3rd Generation Partnership Project (3GPP). Accordingly, the UE 101 can communicate with the base station 105 according to 3GPP NR communication protocols specified in respective communication standards. For example, the system 100 can be a standalone 5G system. The UE 101 interacts with a 5G core network (not shown) via the base station 105. In other examples, the system 100 may operate according to communication standards other than the 5G NR standards.

In one example, the UE 101 and the base station 105 are configured to employ carrier aggregation techniques to communicate with each other. Accordingly, multiple cells 110 and 120a-120n can be configured between the UE 101 and the base station 105. Depending on capability of the UE 101, different number of serving cells can be configured. Each of the multiple cells can correspond to a downlink component carrier, and an uplink component carrier. Alternatively, a cell can be configured asymmetrically, and only an uplink component carrier or a downlink component carrier is transmitted over the respective serving cell.

The downlink component carriers can be transmitted in parallel allowing for an overall wider downlink bandwidth and correspondingly higher downlink data rates. Similarly, the uplink component carriers can be transmitted in parallel allowing for an overall wider uplink bandwidth and correspondingly higher uplink data rates. Different cells can operate on frequency division duplex (FDD) mode or time division duplex (TDD) mode. For cells configured with TDD mode, different uplink-downlink configurations can be used for different component carriers.

The multiple cells include a primary cell (PCell) 110 and one or more secondary cells (SCells) 120a-120n. The PCell 110 can be established to be a first serving cell, for example, after an initial access procedure. A radio resource control (RRC) connection can be established in the PCell 110. The SCells 120a-120n can be subsequently configured through RRC signaling on the PCell 110.

In an embodiment, the UE 101 can dynamically activate or deactivate one or more of the SCells 120a-120n under the control of the base station to adapt to data traffic bursts from the base station 105 to the UE 101. For example, when a downlink traffic volume is low, the SCells 120a-120n can be in a deactivated status. When the base station 105 detects an arrival of a high volume downlink traffic, the base station 105 can signal an activation command to the UE 101. The activation command can be, for example, carried in a medium access control (MAC) control element (CE), a downlink control information (DCI), or the like. The activation command may specify one or more SCell indices corresponding to a set of SCells to be activated.

In response to receiving the activation command from the base station 105, the UE 101 may perform an SCell activation process to activate the SCells indicated in the activation command. The SCell activation process may include a sequence of operations, and thus may incur an SCell activation delay. For example, the sequence of operations may include parsing the MAC CE to obtain the activation command, preparation (or configuration) of hardware and software for reception and transmission on the SCell (e.g., protocol stack software application, radio frequency (RF) module tuning), automatic gain control (AGC) tuning and time-frequency synchronization on the SCell, and the like.

As a result of the SCell activation process, the UE 101 can become ready to perform normal operations on the SCells being activated. For example, the operations can include sounding reference signal (SRS) transmission, channel state information (CSI) reporting, physical downlink control channel (PDCCH) monitoring, physical downlink shared channel (PDSCH) monitoring, physical uplink control channel (PUCCH) transmission, and the like.

On the other hand, when the base station 105 detects a light downlink traffic locally, the base station 105 can signal a deactivation command to the UE 101. The deactivation command may indicate which activated SCells are to be deactivated. In response, the UE 101 can deactivate those indicated SCells and terminate operations on those deactivated SCells. Alternatively, other mechanisms (e.g., a timer) can be employed for deactivating an SCell.

As described above, SCells can be activated to increase a data rate for the UE 101 when data traffic from the base station 105 towards the UE 101 is high, while SCells can be deactivated to save power for the UE 101 when data traffic towards the UE 101 is low.

To take advantage of the above SCell activation/deactivation mechanism, the SCell activation delay is desired to be short to avoid causing latency to the bursty downlink traffics from the base station 105 to the UE 101.

In an embodiment, the system 100 can apply carrier aggregation over frequency bands separated into two different frequency ranges: frequency range 1 (FR 1) and frequency range 2 (FR2). For example, as specified in 3GPP standards, FR1 can include sub-6 GHz frequency bands, while FR2 can include frequency bands from 24.25 GHz to 52.6 GHz. For example, the PCell 110 may operate in FR1 while the SCells 120a-120n may operate in FR2. When new spectra are available, the specification of FR1 or FR2 may be expanded.

Typically, for SCells operating in FR1, beamforming techniques are not used. For SCells operating in FR2, beamforming techniques can be employed and directional transmission (e.g., beam sweeping operation) may be performed at both the UE 101 and the base station 105. Synchronization signal blocks (SSBs) can be transmitted for purpose of time-frequency synchronization and broadcast of system information. For example, the base station 105 can perform a beam sweeping to transmit a sequence of SSBs (referred to as an SSB burst set) towards different directions to cover a cell. Each SSB among the SSB burst set is transmitted with a different transmission (Tx) beam. Such an SSB burst set can be periodically transmitted with a period of 5 ms, 10 ms, 20 ms, and the like.

The UE 101 may also perform a beam sweeping process for an SCell operating in FR2. During this process, the UE 101 can use a different reception (Rx) beam to receive the different SSB burst set. For each link corresponding to a pair of Tx beam and Rx beam, the UE 101 can measure reference signal received power (RSRP) of each beam pair link at physical layer (L1). This measurement is referred to as L1-RSRP measurement. Results of the L1-RSRP measurement can indicate link qualities corresponding to each beam pair link, and therefore indicate which Tx beams (each indicated by an SSB index) are best choices for downlink transmission, and which Rx beams are best choices for receiving a signal from a Tx beam. The L1-RSRP measurement results can be reported to the base station 105 in some examples.

The L1-RSRP measurement results can be reported from physical layer to RRC layer at the UE 101 in some examples. A layer three (L3) RSRP measurement results can be derived from the L1-RSRP measurement results at the RRC layer. A L3-RSRP measurement report including beam level measurement results of a specific SCell can be transmitted from the UE 101 to the base station 105. When multiple SCells are configured, a L3-RSRP measurement report can include beam level and/or cell level measurement results. For example, based on the beam level information, the base station 105 can determine a Tx beam for a respective SCell, while based on the cell level information, the base station 105 can select best SCells for activation or deactivation.

For example, at the base station, when transmitting a signal, such as a PDCCH, a PDSCH, a CSI reference signal (CSI RS) and the like, a best choice of Tx beam can be selected based on beam pair link qualities indicated by the L3-RSRP report or the L1-RSRP report. The base station 105 may indicate an SSB (e.g., using an SSB index) corresponding to the selected Tx beam to the UE 101. The indication can be in the form of a transmission configuration indication (TCI) state signaled from the base station 105 to the UE 101. The TCI state can provide an SSB (using an SSB index) and a quasi-co-location (QCL) type (e.g., Type D corresponding to spatial receiver parameters). Such a TCI state can indicate to the UE 101 that the SSB is quasi-co-located (QCLed) with the to-be-transmitted signal in terms of the QCL type. When Type-D TCI state is indicated, based on the SSB index indicated TCI state and the previously acquired L1-RSRP (or L3-RSRP) measurement results, the UE 101 can use a best Rx beam corresponding to the indicated SSB index for reception of the signal.

When beamforming is employed and the TCI mechanism is utilized, during the SCell activation process to activate an SCell as described herein, the SCell activation delay may further include periods for waiting for TCI state indications useful for some operations related with the SCell activation process. For example, a TCI state may be signaled to the UE 101 in a MAC CE (or a MAC CE activation command) to indicate an SSB (in form of an SSB index) for PDCCH or PDSCH reception. Accordingly, the time-frequency synchronization operation can be performed based on this SSB, and a Rx beam corresponding to this SSB can be used for the time-frequency synchronization operation. For another example, a MAC CE (or a MAC CE activation command) may be signaled to the UE 101 to activate a set of CSI-RS resources. This MAC CE can also indicate an SSB index for CSI-RS reception. Accordingly, a Rx beam corresponding to the indicated SSB index can be determined at the UE 101, and used for measuring the respective CSI RS. In the above examples, receiving those MAC CEs may also cause delays for the SCell activation process.

Figure 2:
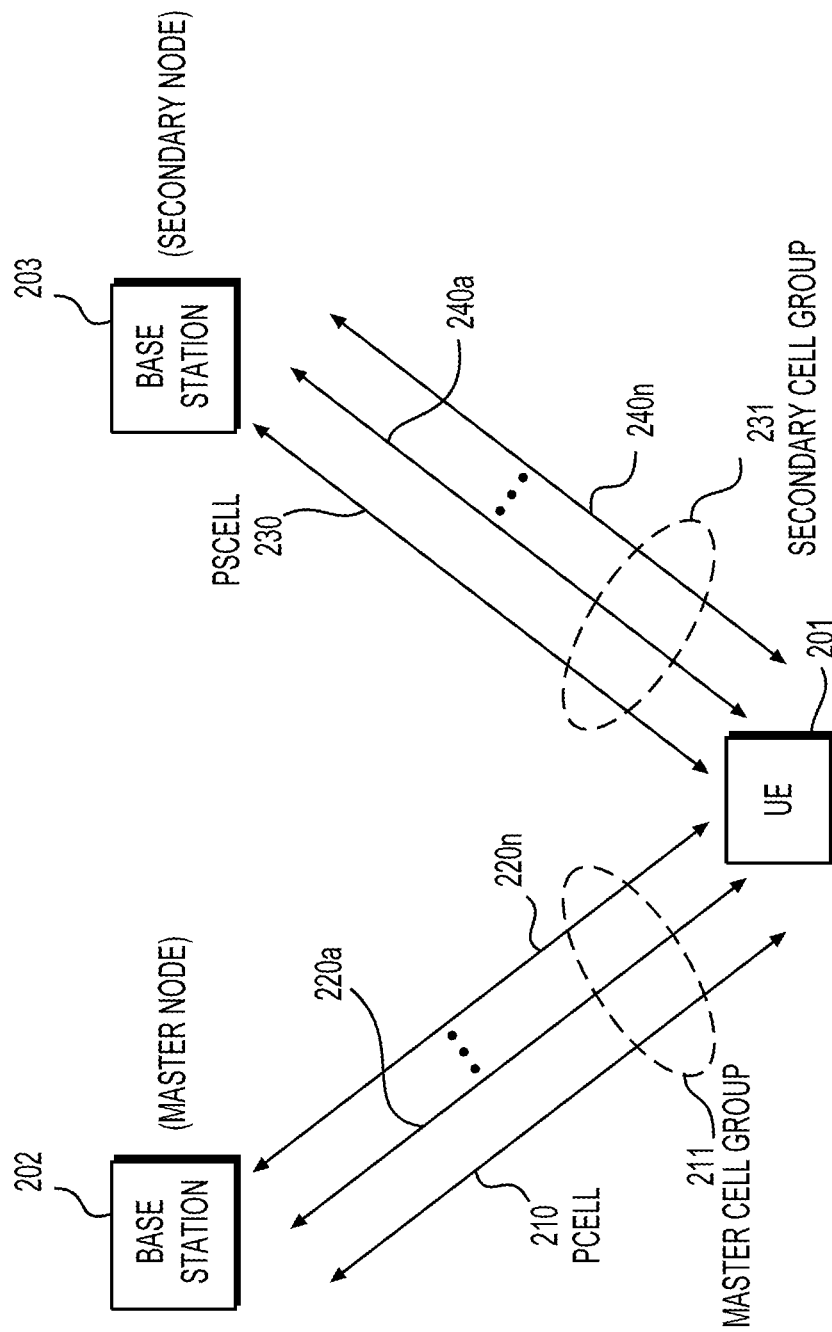
FIG. 2 shows another wireless communication system 200 according to an embodiment of the disclosure.

FIG. 2 shows another wireless communication system 200 according to an embodiment of the disclosure. The system 200 can employ dual connectivity (DC) mechanisms to increase data throughput at a UE 201. The system 200 can include the UE 201 and two base stations 202-203. The base station 202 can serve as a master node, while the base station 203 can serve as a secondary node. A first cell group 211, referred to as a master cell group (MCG), is established between the master node 202 and the UE 201, while a second cell group 231, referred to as a secondary cell group (SCG), is established between the secondary node 203 and the UE 201. The MCG 211 can include a PCell 210 and SCells 220a-220n, while the SCG 231 can include a primary SCG cell (PSCell) 230 and SCells 240a-240n.

In an embodiment, the nodes 202 and 203 can independently perform resource scheduling for the MCG 211 and the SCG 231, respectively. In some examples, an RRC connection can be provided on the PCell 210. However, in some examples, no RRC connection is provided on the PSCell 230 or the SCells 220a-220n and 240a-240n. In addition, configurations between the MCG 211 and the SCG 23) can be independent. The configurations can include frequency bands, bandwidth, number of component carriers, frame structures of component carriers (e.g., frequency division duplex (FDD) or time division duplex (TDD)), and the like.

For each cell group 211 or 231, the PCell 210 or the PSCell 230 can first be established, and the SCells can be configured, for example, by RRC signaling on the PCell 210. The respective SCells can then be activated or deactivated to adapt to status of data traffic. For example, an SCell activation or deactivation command MAC CE can be received on the PCell 210 to add or remove one or more SCells belonging to the MCG 211. Similarly, an SCell activation or deactivation command MAC CE can be received on the PSCell 230 to add or remove one or more SCells belonging to the SCG 231.

In various embodiments, the base stations 202 and 203 may utilize different or a same radio access technology (RAT). For example, both the base stations 202 and 203 can employ 5G NR RAT. Such a configuration is referred to as NR-DC mode. Or, the base stations 202 and 203 may employ different RAT. Such a configuration is referred to as MR-DC, a short for muti-RAT DC. For example, the master node 202 employs a Long Term Evolution (LTE) air interface (e.g., Evolved UMTS Terrestrial Radio Access Network (E-UTRAN)), while the secondary node 203 employs the 5G NR air interface. Such a configuration is referred to as EN-DC. In contrast to EN-DC, there can be another DC mode referred to as NE-DC. In NE-DC, a master node can be a 5G gNB employing the NR air interface, while a secondary node can be an LTE eNB employing the E-UTRAN air interface.

The SCell activation delay reduction techniques disclosed herein can be applied to various scenarios where a UE is operating on a PCell or a PSCell in standalone mode (FIG. 1 example), or NR-DC or MR-DC (e.g. EN-DC, or NE-DC) mode (FIG. 2 example), and one or more SCells are being activated based on TCI states signaled on the PCell or the PSCell.

Figure 3:
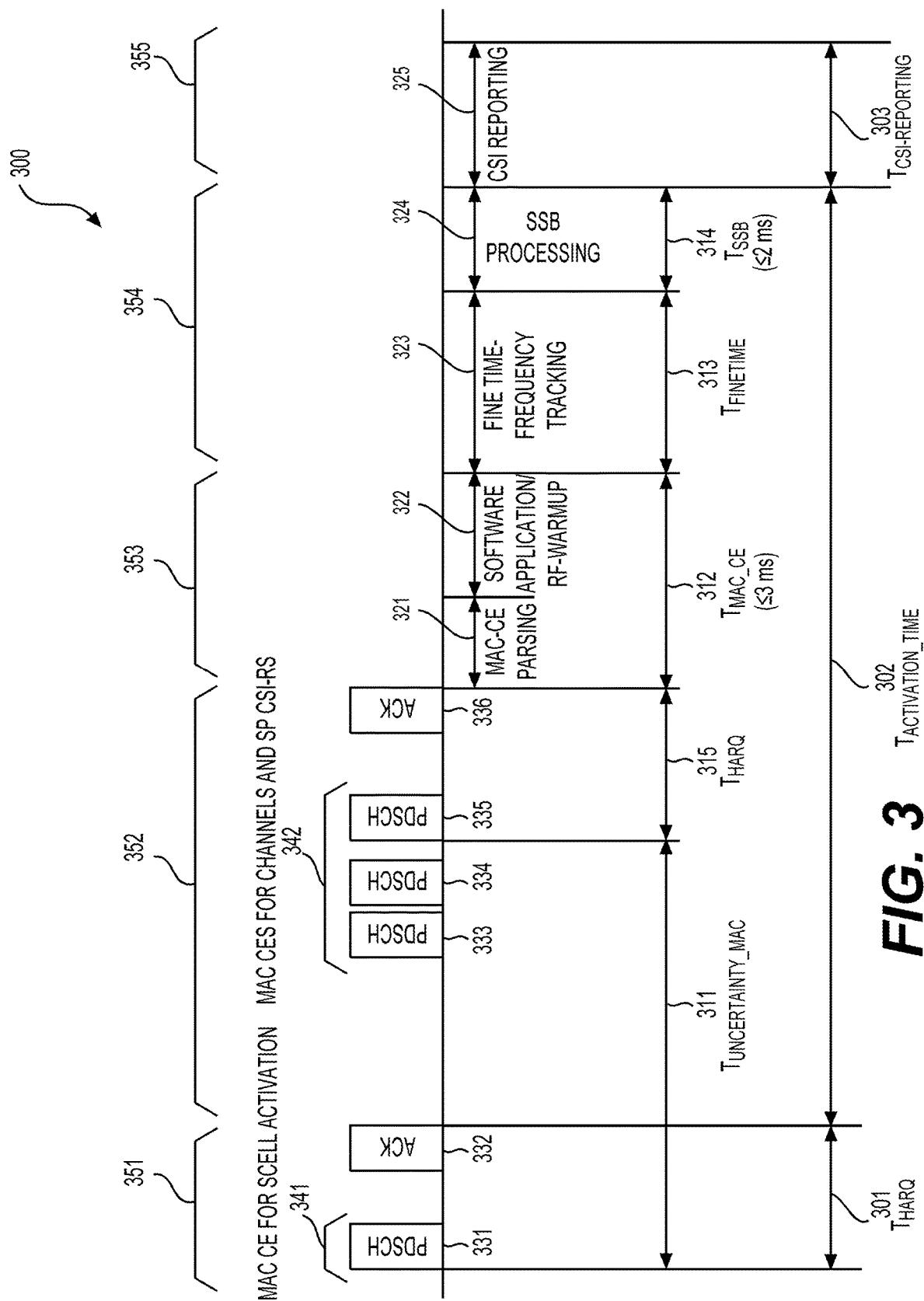
FIG. 3 shows a secondary cell (SCell) activation process 300 according to an embodiment of the disclosure.

FIG. 3 shows a single SCell activation process 300 according to an embodiment of the disclosure. The UE 101, the base station 105, and the PCell 110 and the SCells 120a-120n in the FIG. 1 example are used for explanation of the process 300. By performing the process 300, an SCell (e.g., the SCell 120a) can be activated.

In the FIG. 3 example, the PCell 110 has been established. The SCells 120a-120n has been configured by the base station 105 to the UE 101. Accordingly, control signaling (e.g., MAC CEs) can be received on the PCell 110 for activating or deactivating one of the SCells 120a-120n.

In addition, the PCell 110 can operate on FR1 or FR2 (e.g., millimeter wave region). The SCells 120a-120n can be configured to operate on FR2. Accordingly, beamforming can be employed in the SCells 120a-120n, and the TCI scheme can be employed for indicating Rx beams at the UE 101. Further, semi-persistent (SP) CSI-RS is used for CSI reporting on the respective SCells 120a-120n. Accordingly, a MAC CE activation command can be used for activating an SP CSI-RS resource set during the process 300.

Additionally, the SCell 120a can be the first SCell to be activated on an FR2 band during the process 300. Assuming another SCell, for example, the SCell 120n, has already been established on FR2 before the SCell 120a, and operates in a frequency band neighboring that of the SCell 120a. As the SCells 120a and 120n can be co-located on a same site, beamformed radio channels of the two SCells 120a and 120n can have a similar property. Accordingly, when activating the SCell 120a, the UE 101 can take advantage of the known channel property of the SCell 120n to simplify the process 300 of activating the SCell 120a. For example, signaling of TCI states and/or CSI reporting may become unnecessary under certain conditions. Accordingly, when the SCell 120a is not the first SCell to be activated on an FR2 band, a process for activating the SCell 120a can be different from the process 300.

Furthermore, the process 300 can be performed with an assumption that the SCell 120a is known to the UE 101. For example, before the UE 101 receives an activation command for activating the SCell 120a, the UE 101 has sent a valid L3-RSRP measurement report (or a L1-RSRP measurement report) of the SCell 120a with SSB indices (beam level information). In addition, an interval between the L3-RSRP measurement report and the activation command is short enough (e.g. within several SCell measurement cycles or 5 DRXs) such that the measurement results can be used as the basis for determining the TCI states useful for the activation of the SCell 120a. When the above conditions are satisfied, the SCell 120a operating on FR2 is said to be known to the UE 101.

For example, for a first SCell activation in FR2 bands, the SCell is known if it has been meeting the following conditions:

(i) During the period equal to 4s for UE supporting power class 1 and 3s for UE supporting power class 2/3/4 before UE receives the last activation command for PDCCH TCI, PDSCH TCI (when applicable) and semi-persistent CSI-RS for CQI reporting (when applicable): the UE has sent a valid L3-RSRP measurement report with SSB index, and SCell activation command is received after L3-RSRP reporting and no later than the time when UE receives MAC-CE command for TCI activation.

(ii) During the period from L3-RSRP reporting to the valid CQI reporting, the reported SSBs with indexes remain detectable according to certain cell identification conditions, and the TCI state is selected based on one of the latest reported SSB indexes.

In contrast, when the above conditions are invalid, the SCell 120a operating on FR2 is said to be unknown to the UE 101. For example, for unknown SCell, the activation commands for PDCCH TCI, PDSCH TCI (when applicable), semi-persistent CSI-RS for CQI reporting (when applicable), and configuration message for TCI of periodic CSI-RS for CQI reporting (when applicable) can be based on a latest valid L1-RSRP reporting.

In such a scenario, after receiving an activation command for activating the SCell 120a, the UE 101 can perform an L1-RSRP measurement process to obtain beam pair link qualities, accordingly derive an L3-RSRP measurement report with beam level information, and transmit the L3-RSRP measurement report to the base station 105. Thereafter, based on the latest L3-RSRP measurement report, the base station 105 can transmit activation command(s) for PDCCH TCI, PDSCH TCI (when applicable), and SP CSI-RS for CQI reporting. Such an SCell activation process for activating an unknown SCell would incur a longer delay than the process 300.

In FIG. 3, the process 300 can start with reception of an MAC CE 341 for single SCell activation, and end with transmitting a valid CSI report at the end of a CSI reporting process 325. The process 300 can include five phases 351-355.

At phase 351, the MAC CE 341 for single SCell activation can be received. The MAC CE 341 can be carried in a PDSCH 331 transmitted on the PCell 110. The UE 101 may then decode a transport block (TB) from the PDSCH 331 followed by a cyclic redundancy check (CRC) verification. When the CRC verification is successful, the UE 101 may transmit a hybrid automatic repeat request (HARQ) ACK feedback. A delay between the PDSCH 331 and the ACK 332 is denoted $T_{HARQ}$ 301.

The MAC CE 341 may specify an SCell index corresponding to the SCell 120a, such that the UE 101 can know the SCell 120a is to be activated based on a configuration of SCells previously received on the PCell 110. Additionally, the MAC CE 341 may indicate more than one SCell for activation.

At phase 352, one or multiple MAC CEs 342 for channels and/or SP CSI-RS on the SCell 120a can be received on the PCell 110. As an example, three PDSCHs 333-335 of the PCell 110 are shown in FIG. 3 that carry those MAC CEs 342. A first MAC CE, denoted MAC CE 342-1, can be a MAC CE for indicating a TCI state for PDCCH reception on the SCell 120a. A second MAC CE, denoted MAC CE 342-2, can be a MAC CE for activating TCI states for PDSCH reception on the SCell 120a. A third MAC CE, denoted MAC CE 342-3, can be a MAC CE for activating an SP CSI-RS resource sent on the SCell 120a. The MAC CE 342-3 can indicate a TCI state for receiving SP CSI-RS over respective SP CSI-RS resource.

An SSB indicated by one of the TCI states identified by the MAC CE 342-1 or 342-2 can later be used for time-frequency tracking on the SCell 120a. The SSB indicated by one of the TCI states identified by the MAC CE 342-1 or 342-2 can also be used for PDCCH or PDSCH reception on the SCell 120a. An SSB indicated by the TCI state identified by the MAC CE 342-3 can later be used for CS measurement and reporting of the SCell 120a.

The order of arrivals of the PDSCHs 333-335 can vary depending on transmission decisions of the base station 105. In an example, the SSB of the earlier one of the MAC CE 342-1 or 342-2 is used for the time-frequency tracking on the SCell 120a. Thus, once the SSB is available, the UE 101 can proceed to enter a next operation without waiting for the late-arrived MAC CE in order to avoid delay. In an example, the SSB of one of the MAC CEs 342-1 and 342-2 is designated for usage of time-frequency tracking. Accordingly, the UE 101 may wait for this MAC CE before initiating the next operation. In addition, under some scenarios, one of the MAC CEs 342-1 or 342-2 may not be transmitted.

As shown in FIG. 3, a delay 311, denoted $T_{uncertainty\_MAC}$, incurs between reception of the PDSCH 331 and reception of the last one of the PDSCHs 333-335. In some examples, the MAC CEs 342 may be carried in the PDSCH 331. Accordingly, the delay $T_{uncertainty\_MAC}$ can be reduced to zero.

Corresponding to each of the PDSCHs 333-335, an HARQ ACK feedback can be transmitted from the UE 101 to the base station 105. In FIG. 3, only the ACK of the last one of the PDSCHs 333-335 is shown. A delay, denoted $T_{HARQ}$ 315, occurs between reception of the last of the PDSCHs 333-335 and the transmission of the ACK 336.

While three PDSCHs 333-335 are shown in FIG. 3 for separately carrying the MAC CEs 342-1, 342-2, and 342-3, it is possible that the MAC CEs 342-1, 342-2, and 342-3 are carried in fewer (one or two) PDSCHs.

At phase 353, a MAC CE processing and applying process (e.g., processes 321 and 322) can be performed. In the process 321, a TB of the last one of the PDSCHs 333-335 can be received from a physical layer at a MAC layer of the UE 101. Fields of the MAC CE are then parsed. Parsing processes similar to the process 321 can be performed for each of the MAC CEs 342. The process 322 may include software application and RF warmup operations. Parameters (e.g., spatial receiver parameters, carrier frequency of the SCell 120a, and the like) can be applied at the UE 101 to make the UE 101 ready for receiving synchronization signals from the SCell 120a.

The operations during the phase 353 can incur a delay 312, denoted $T_{MAC\_CE}$. Considering capability of the UE 101, the delay $T_{MAC\_CE}$ 312 can be bounded to be smaller than or equal to 3 ms in order to control a total SCell activation delay.

At phase 354, a fine time-frequency synchronization process (e.g., processes 323 and 324) can be performed. In the process 323, the UE 101 may wait for arrival of a first complete SSB, and perform reception of the SSB. For example, the SSB captured by the UE 101 can be that indicated by the TCI state of the MAC CE 342-1 or 342-2. The Rx beam used by the UE 101 for reception of the SSB can be determined based on the TCI state of the MAC CE 342-1 or 342-2.

A delay 313, denoted $T_{FineTime}$, can occur during the process 323. $T_{FineTime}$ can be the time period between the UE 101 completes processing the last activation command of the MAC CEs 342 for PDCCH TCI, PDSCH TCI (when applicable) and SP CSI-RS (when applicable) and the timing of the first complete available SSB corresponding to the TCI state of the MAC CE 342-1 or 342-2.

In the process 324, the UE 101 can process a received signal of the SSB, and conduct fine time-frequency tuning accordingly. As a result, the UE 101 becomes ready for monitoring PDCCH and PDSCH of the SCell 120a, and performing the CSI reporting process 325. A delay 314, denoted $T_{SSB}$, occurs during the process 324. Considering capability of the UE 101, the delay $T_{SSB}$ 314 can be bounded to be smaller than or equal to 2 ms in order to control the total SCell activation delay.

At a final phase 355, the CSI reporting process 325 can be performed. The process 325 can include operations of acquiring a first available downlink CSI reference resource, processing for CSI reporting, and reporting CSI measurement results with a first available CSI reporting resources. Accordingly, a delay 303, denoted $T_{CSI\_reporting}$, can occur that includes a delay including uncertainty in acquiring the first available downlink CSI reference resource, UE processing time for the CSI reporting, and uncertainty in acquiring the first available CSI reporting resources.

As can be seen, the consumed time of the process 300 between reception of the SCell activation command in the MAC CE 341 and transmission of the CSI report at the end of the CSI reporting process 325 is $$T_{HARQ} + T_{activation\_time} + T_{CSI\_reporting}. \quad (I)$$

In the above expression, $T_{HARQ}$ is the delay $T_{HARQ}$ 301. $T_{CSI\_reporting}$ is the delay $T_{CSI\_reporting}$ 303. $T_{activation\_time}$ 302 can be a sum of $T_{uncertainty\_MAC}$, $T_{MAC\_CE}$, $T_{FineTime}$, and $T_{SSB}$ $$T_{activation\_time} = T_{uncertainty\_MAC} + T_{MAC\_CE} + T_{FineTime} + T_{SSB}.$$

When $T_{MAC\_CE}$ and $T_{SSB}$ take the maximum values 3 ms and 2 ms, respectively, set for bounding the SCell activation delay, a maximum value of the delay $T_{activation\_time}$ can be estimated to be $$T_{uncertainty\_MAC} + T_{FineTime} + 5 \text{ ms}.$$

Accordingly, if the SCell activation command is received in slot n, the UE 101 can transmit the CSI report and apply actions (e.g., PDCCH monitoring) related to the activation command for the SCell 120a being activated no later than in slot $$n + \frac{T_{HARQ} + T_{activation\_time} + T_{CSI\_ceporting}}{NR \text{ slot length}}.$$

The NR slot length depends on a subcarrier spacing used in the SCell 120a. For example, corresponding to the subcarrier spacing of 15, 30, 60, 120, and 240 KHz, the slot length can be 1, ½, ¼, ⅛, and ¹⁄₁₆ ms, respectively.

Figure 4:
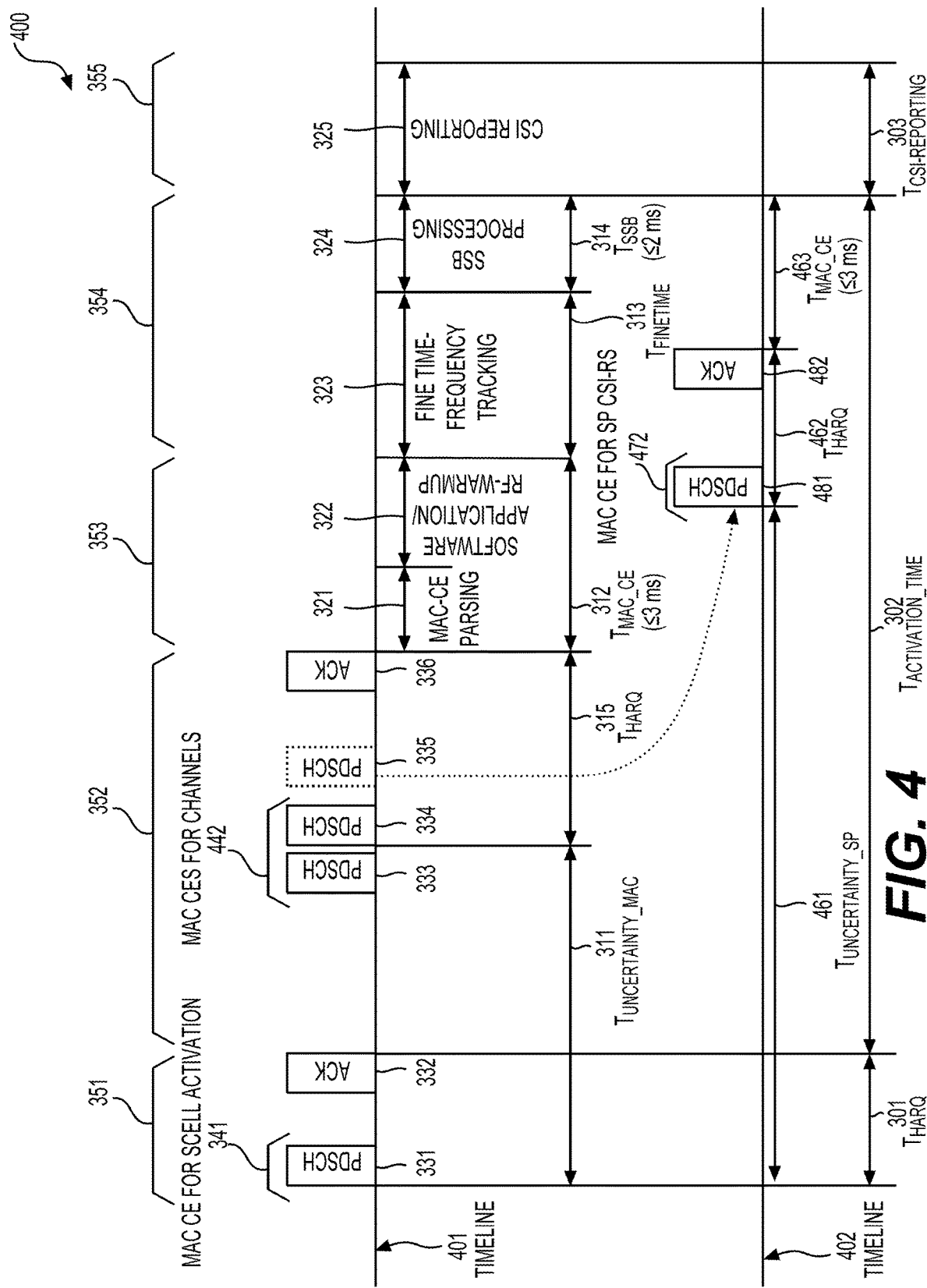
FIG. 4 shows another SCell activation process 400 according to an embodiment of the disclosure.

FIG. 4 shows another single SCell activation process 400 according to an embodiment of the disclosure. The process 400 has been improved to reduce SCell activation time compared with the process 300. In the process 300 in FIG. 3, phase 353 does not start until MAC CE(s) for channels (PDCCH TCI indication MAC CE 342-1 and PDSCH TCI activation MAC CE 342 (when applicable)) and MAC CE for SP CSI-RS (SP CSI-RS resource set activation MAC CE 342-3) are all available. However, to reduce SCell activation delay, in the process 400, the MAC CE for SP CSI-RS is decoupled from the start of phase 353. In other words, phase 353 can start even when a MAC CE for SP CSI-RS is not received yet. This decoupling is feasible because the fine time-frequency tracking process (323 and 324) of phase 354 does not rely on information provided by the MAC CE for SP CSI-RS.

Accordingly, FIG. 4 shows two separate timelines 401 and 402. Operations on the timeline 401 is similar to that in FIG. 3 except that the PDSCH (e.g., PDSCH 335) carrying the MAC CE 342-3 for SP CSI-RS is excluded from the MAC CEs 342. Now on timeline 401, MAC CEs 442 are shown which can correspond to the MAC CEs 342-1 and 342-2.

On the timeline 402, reception of a MAC CE 472 for SP CSI-RS is shown in parallel with reception of MAC CEs 442 and the processes 321-324. Specifically, a PDSCH 481 carrying the MAC CE 472 can be received on the PCell 110 after a delay $T_{uncertainty\_SP}$ 461. Then, an ACK 482 is transmitted from the UE 101 on the PCell 110 after a delay $T_{HARQ}$ 462. Thereafter, during a delay $T_{MAC\_CE}$ 463, operations similar to that of the processes 321 and 322 are performed. The MAC CE 472 is parsed and applied during the delay $T_{MAC\_CE}$ 463.

Based on the operations of the two timelines 401402, the CSI reporting process 325 can start after the timing of the end of the SSB processing process 324 or the timing of the end of the MAC CE process during $T_{MAC\_CE}$ 463, whichever comes late. In this way, the SCell activation delay of the SCell 120a can be reduced when the delay $T_{uncertainty\_SP}$ 461 is longer than the delay $T_{uncertainty\_MAC}$ and the MAC CE process during $T_{MAC\_CE}$ 463 ends earlier than the SSB processing process 324.

Accordingly, the delay $T_{activation\_time}$ in the expression (1) can be estimated as $$T_{MAC\_CE} + \max(T_{uncertainty\_MAC} + T_{FineTime} + T_{SSB}, T_{uncertainty\_SP}).$$

When $T_{MAC\_CE}$ and $T_{SSB}$ take the maximum values 3 ms and 2 ms, respectively, set for bounding the SCell activation delay, a maximum value of the delay $T_{activation\_time}$ can be estimated to be $$3 \text{ ms} + \max(T_{uncertainty\_MAC} + T_{FineTime} + 2 \text{ ms}, T_{uncertainty\_SP}).$$

Figure 5:
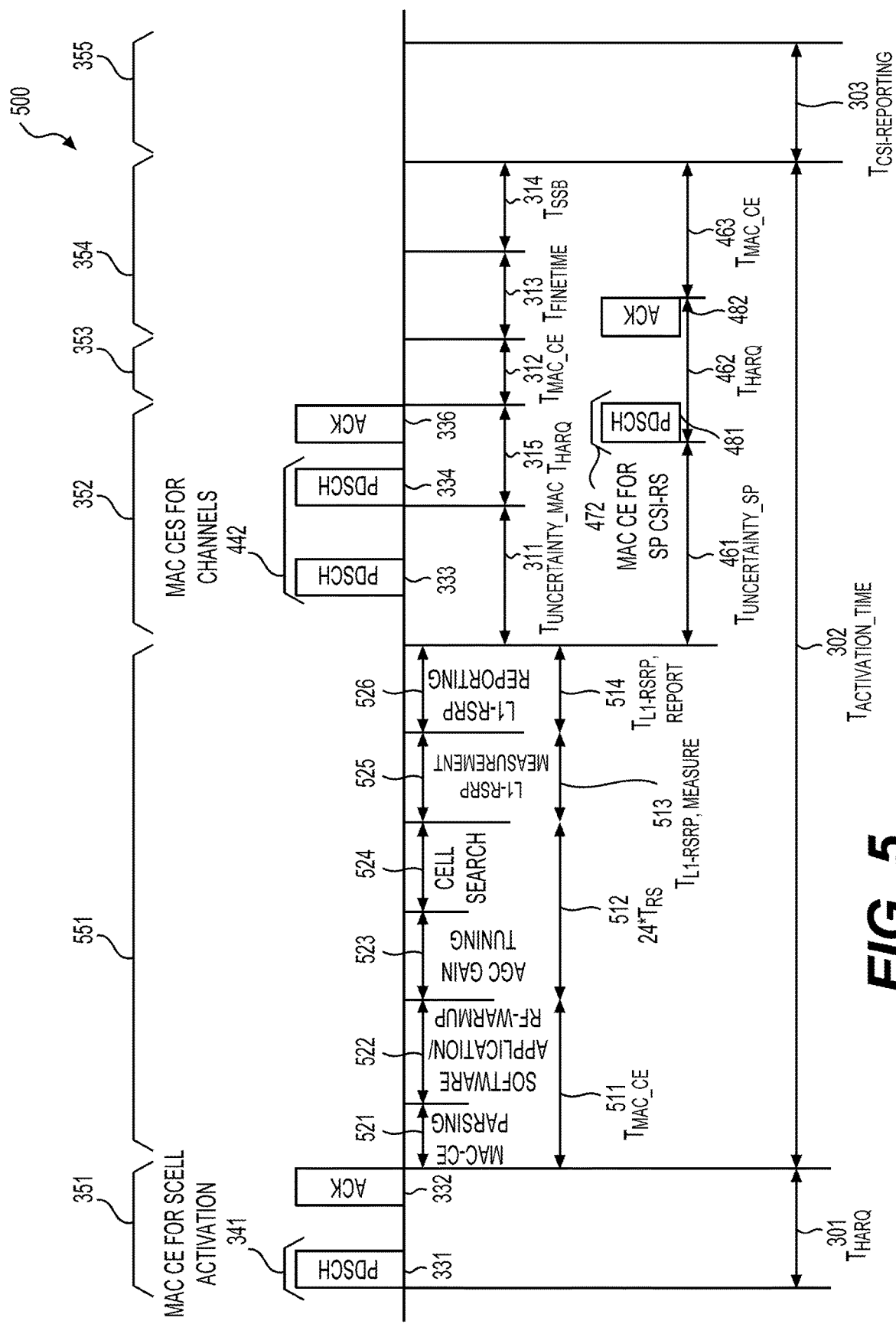
FIG. 5 shows another SCell activation process 500 according to an embodiment of the disclosure.

FIG. 5 shows another single SCell activation process 500 according to an embodiment of the disclosure. Different from the process 400 where the SCell 120a is known to the UE 101, the process 500 assumes that the SCell 120a is unknown to the UE 101. Accordingly, compared with the process 400, the process 500 includes an additional phase 551 between the phases 351 and 352 as shown in FIG. 5. During the phase 551, an L1-RSRP measurement process is performed on the SCell 120a being activated, and measurement results are reported to the base station 105 on the PCell 110.

Specifically, the process 500 starts with phase 351 where the PDSCH 331 carrying the SCell activation MAC CE 341 is decoded, and the ACK 332 is transmitted on the PCell 110. Following phase 351, a MAC CE processing process (521 and 522) is performed and incurs a delay $T_{MAC\_CE}$ 511. Operations 521 and 522 are similar to that of the processes 321 and 322 in FIG. 4. Then, an AGC tuning process 523 and a cell search process 524 are successively performed.

In an embodiment, the processes 523 and 524 incur a delay 512, denoted $T_{cell\ identification\ with\ Rx\ training}$.

$T_{cell\ identification\ with\ Rx\ training}$ is a period for cell identification with Rx beam training. $T_{cell\ identification\ with\ Rx\ training}$ can includes time for AGC tuning and cell search with Rx beam training. In an example, $T_{cell\ identification\ with\ Rx\ training}$ can be a period of $24*T_{rs}$. $T_{rs}$ can n SSB measurement timing configuration (SMTC) periodicity of the SCell 120a being activated when the UE 101 has been provided with an SMTC for the SCell 120a in an SCell addition message. Alternatively, $T_{rs}$ can be a periodicity of an SMTC of a measurement object (e.g., another SCell) having a same SSB frequency and subcarrier spacing as the SCell 120a. In an example, if the UE 101 is not provided the SMTC configuration or the measurement object, the requirement which involves $T_{rs}$ can be applied with $T_{rs}$=5 ms assuming an SSB transmission periodicity is 5 ms.

After the cell search process 524, an L1-RSRP measurement process 525 and an L1-RSRP reporting process 526 can be successively performed. In the process 525, beam sweepings with Tx beams of the base station 105 and beam sweepings with Rx Beams of the UE 101 can be performed on the SCell 120a. Beam pair link qualities (e.g., RSRP) can be measured based on SSBs. In the process 526, L1-RSRP measurement results of the SCell 120a can be reported to the base station 105 on the PCell 110. In another example, the L1-RSRP measurement results of the SCell 120a can be provide from the physical layer to the RRC layer of the UE 101, and L3-RSRP measurement results can accordingly be derived and reported to the base station 105 on the PCell 110. At this point, the base station 105 becomes aware of the beam level link qualities, and can use the beam level link qualities as a basis for determining the TCI states carried in the MAC CEs 442 and MAC CE 472.

In total, the phase 551 incurs a delay of $$T_{MAC\_CE}(511) + T_{cell\ identification\ with\ Rx\ training} + T_{L1-RSRP,measure} + T_{L1-RSRP,report},$$

where $T_{L1-RSRP,measure}$ 513 and $T_{L1-RSRP,report}$ 514 correspond to the processes 525 and 526, respectively. $T_{L1-RSRP,report}$ 514 can include time for acquiring CSI reporting resources.

After the end of the L1-RSRP reporting process, operations similar to that of the process 400 are performed. For example, MAC CEs 442 for PDCCH TCI, and PDSCH TC, and MAC CE 472 for SP CS-RS activation are received. The fine time-frequency synchronization (323 and 324 in FIG. 4) is performed followed by the CSI reporting process (325 in FIG. 4).

As shown, both the delays $T_{uncertainty\_MAC}$ 311 and $T_{uncertainty\_SP}$ 461 are measured relative to the end of the L1-RSRP reporting process 526, which is different from the process 400.

Accordingly, with consideration of the SCell 120a being unknown, in the process 500, the delay $T_{activation\_time}$ in the expression (1) can be $$T_{MAC-CE}(511) + T_{cell\ identification\ with\ Rx\ training} + T_{L1-RSRP,measure} + T_{L1-RSRP,report} + T_{HARQ} + T_{MAC\_CE} (312\ or\ 463) + \max(T_{uncertainty\_MAC} + T_{FineTime} + T_{SSB}, T_{uncertainty\_SP}).$$

When $T_{MAC\_CE}$ and $T_{SSB}$ take the maximum values 3 ms and 2 ms, respectively, that are set for bounding the SCell activation delay, a maximum value of the delay $T_{activation\_time}$ of the process 500 can be estimated to be $$6\ ms + T_{cell\ identification\ with\ Rx\ training} + T_{L1-RSRP,measure} + T_{L1-RSRP,report} + T_{HARQ} + \max(T_{uncertainty\_MAC} + T_{FineTime} + 2\ ms, T_{uncertainty\_SP}).$$

Figure 6:
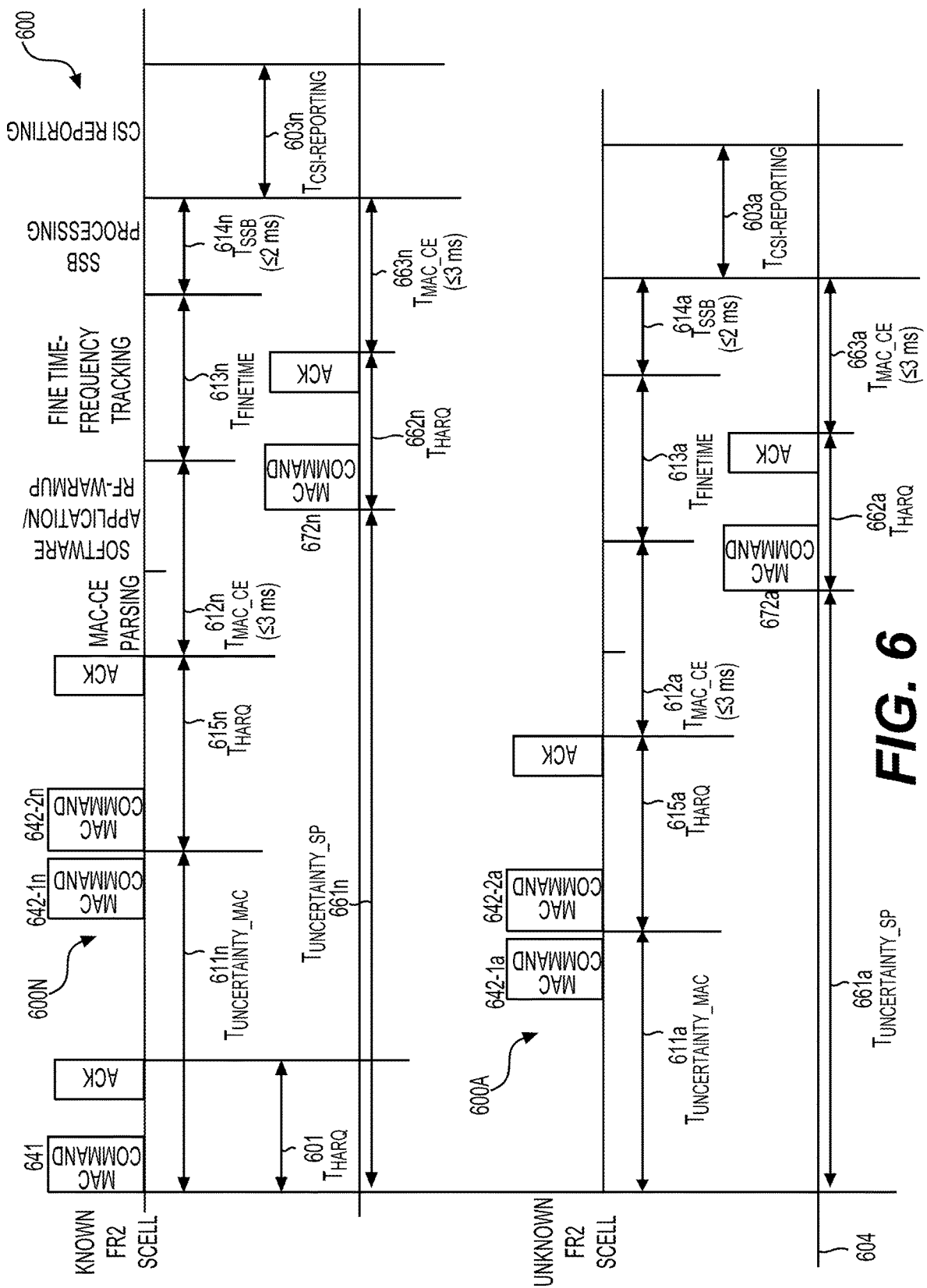
FIG. 6 shows a multi-SCell activation process 600 according to an embodiment of the disclosure.

FIG. 6 shows a multi-SCell activation process 600 according to an embodiment of the disclosure. During the process 600, one MAC CE command is received for activating two SCells (one known, one unknown) operating in a same band in FR2. The FIG. 1 example is used to explain the process 600. The two SCells can be a first SCell 120n that is known and a second SCell 120a that is unknown as shown in FIG. 1.

Assuming the unknown SCell 120a is to be activated solely without other active serving cell or known cell operating in the same FR2 band, the process 500 in FIG. 5 example would be performed to activate the SCell 120a. However, with the known SCell 120n in the same FR2 band as the SCell 120a, the process 500 can be simplified and transformed into the process 600, and the activation delay of the unknown SCell 120a can be reduced.

In some examples, when the two SCells 120n and 120a operate in a same FR2 band (intra-band FR2 SCells), the UE 101 can assume a deployment that the two SCells are co-located at a same site, and the transmitted signals from the two serving cells 120n and 120a can have the same downlink spatial domain transmission filter on one OFDM symbol in the same FR2 band. Thus, Tx beams from the SCells 120n and 120a can have a same beam direction at a time. Channels transmitted on the SCells 120n and 120a may have similar properties.

For the process 600, the SCell 120n is known to the base station 105. The base station 105 thus has the knowledge of the Tx beam qualities for the SCell 120n. Because the SCells 120a and 120n are intra-band FR2 cells, the base station 105 can use the knowledge of the Tx beam qualities in the SCell 120n for selection Tx beams in the SCell 120a, and signal TC states accordingly. As a result, there is no need for the to-be-activated unknown SCell 120a to perform L1-RSRP measurement and report process (e.g., the operations 525 and 526 in the FIG. 5 example are not performed) during the multi-SCell activation process 600.

In addition, in some examples, when the two SCells 120n and 120a operate in a same FR2 band (intra-band FR2 SCells), the UE 101 can further assume a deployment that the two SCells have a similar frame timing. For example, a maximum receiving timing difference (MRTD) for intra-band non-contiguous carrier aggregation in FR2 can be 260 ns in an example.

For the process 600, the SCell 120n is known to the UE 101. The UE 101 thus knows the frame timing on the SCell 120n. Because the SCells 120a and 120n are intra-band FR2 cells, frame timing on the SCell 120a can be established, for example, within an error of an MRTD. As a result, the cell search (or cell detection) (e.g., operation 524 in the FIG. 5 example) can be avoided during the multi-SCell activation process 600.

Further, in some examples, for the two SCells 120n and 120a operate in a same FR2 band (intra-band FR2 SCells), the UE 101 may be configured with a same set of RF circuitry for reception of the two SCells 120n and 120a. Accordingly, RF module adjustment (e.g., spatial filter application for Rx beam forming, or AGC settling) for the two SCells 120n and 120a can be performed at the same time. When the SCell 120n is known to the UE 101 (AGC related parameters are known), the corresponding AGC settling process (e.g., the operation 523 in FIG. 5) can be skipped for both the SCells 120n and 120a during the multi-SCell activation process 600.

Specifically, in the process 600, a MAC command 641 for activating both the known SCell 120n and the unknown SCell 120a can be received. The MAC command 641 can be carried in a MAC CE transmitted on a PDSCH. The UE 101 may feedback a HARQ ACK in response to successfully decoding the PDSCH within a delay $T_{HARQ}$ 601. The UE 101 may parse the MAC CE to obtain content of the MAC command 641. At this moment, the UE 101 can be aware of that the SCells 120n and 120a are to be activated.

In an example, the UE 101 may determine that the SCell 120n is known while the SCell 120a is unknown and the SCells 120n and 120a are intra-band FR2 SCells based on configurations and operation history. Accordingly, the UE 101 can make decision that no AGC settling, cell search (cell detection), or L1-RSRP measurement and reporting is to be performed for both the SCells 120n and 120a.

Subsequently, the UE 101 may carry out activation processes 600N and 600A in parallel corresponding to the SCells 120n and 120a, respectively. As shown in FIG. 6, the processes 600N and 600A can each be similar to the steps performed during the phases 352-355 for both the timelines 401-402 in the process 400 shown in FIG. 4.

For example, in the process 600N, MAC commands 642-1n and 642-2n indicating TCI states for transmissions of PDCCH and PDSCH, respectively, can be received after a period of $T_{uncertainty\_MAC}$ 611n. A HARQ ACK corresponding to the last of the MAC commands 642-1n and 642-2n can be transmitted incurring a delay of $T_{HARQ}$ 615n. Thereafter, a MAC CE processing and application process can take a time of $T_{MAC\_CE}$ 612n followed by a fine frequency and timing synchronization process lasting for a period of $T_{FineTime}$ 613n plus $T_{SSB}$ 614n.

For CSI-RS activation and corresponding TCI state indication, a MAC command 672n can be received after a period of $T_{uncertainty\_MAC}$. In response, a HARQ ACK can be transmitted after a delay of $T_{HARQ}$ 662n. Then, a MAC CE processing and application process can last for a period of $T_{MAC\_CE}$ 663n. After the above fine timing synchronization and CSI-RS MAC CE application are both completed, a CSI reporting process can be performed which may cause a delay of $T_{CSI\_reporting}$ 603n.

For the process 600A, the steps as shown in FIG. 6 can be performed in a way similar to those of the process 600N. For example, the delays 611a-615a, 661a-663a, and 603a in the process 600A can take place similarly as the counter parts 611n-615n, 661n-663n, and 603n in the process 600N.

In addition, for the process 600A, in some examples, the TCI configurations for the unknown SCell 120a can be different from that for the unknown SCell 120n because each serving cell's timing/Doppler configuration RS (e.g., SSB or CSI-RS) can be configured independently. Accordingly, the TCI and CSI-RS configurations (e.g., the corresponding MAC commands) for each of the SCell 120n and 120a may not come at the same time.

Accordingly, for the process 600A for activating the unknown SCell 120a, the delay $T_{activation\_time}$ in the expression (1) can be estimated as $T_{MAC\_CE}$(612a or 663a)+max($T_{uncertainty\_MAC}$(611a)+
$T_{FineTime}$(613a)+$T_{SSB}$(614a), $T_{uncertainty\_SP}$
(661a)).

When $T_{MAC\_CE}$ and $T_{SSB}$ take the maximum values of 3 ms and 2 ms, respectively, set for bounding the SCell activation delay, a maximum value of the delay e a can be estimated to be 3 ms+max($T_{uncertainty\_MAC}$(611a)+$T_{FineTime}$(613a)+2
ms,$T_{uncertainty\_SP}$(661a)).

In some examples, instead of SP CSI-RS, periodic CSI-RS can be used for CSI measurement and reporting on to-be-activated SCells. Corresponding to the periodic CSI-RS, RRC signaling can be used to indicate the corresponding CSI-RS resource and TCI state in place of the CSI-RS activation MAC commands 672n or 672a in the FIG. 6 example. The process 600A (similarly for the process 600N) can be adjusted in the following way.

An RRC message, for example, carried in a PDSCH, can be received at the place of the MAC command 672a in the corresponding timeline 604 after a delay of $T_{uncertainty\_RRC}$. Then, a process of processing and applying the configuration of the RRC message can be performed which can cause a delay $T_{RRC\_delay}$. The delay can correspond to the periods 662a-663a. Accordingly, when periodic CSI-RS is employed in the to-be-activated unknown SCell 120a, the delay $T_{activation\_time}$ in the expression (1) can be estimated as max($T_{uncertainty\_MAC}$(611a)+$T_{MAC\_CE}$(612a)++
$T_{FineTime}$(613a)+$T_{SSB}$(614a), $T_{uncertainty\_MAC}$
(661a)+$T_{RRC\_delay}$(662a/663a)−$T_{HARQ}$(601 or
662a)).

When $T_{MAC\_CE}$ and $T_{SSB}$ take the maximum values 3 ms and 2 ms, respectively, set for bounding the SCell activation delay, a maximum value of the delay $T_{activation\_time}$ can be estimated to be max($T_{uncertainty\_MAC}$(611a)+$T_{FineTime}$(613a)+5
ms,$T_{uncertainty\_RRC}$(661a)+$T_{RRC\_delay}$(662a/
663a)−$T_{HARQ}$(601 or 662a)).

Figure 7:
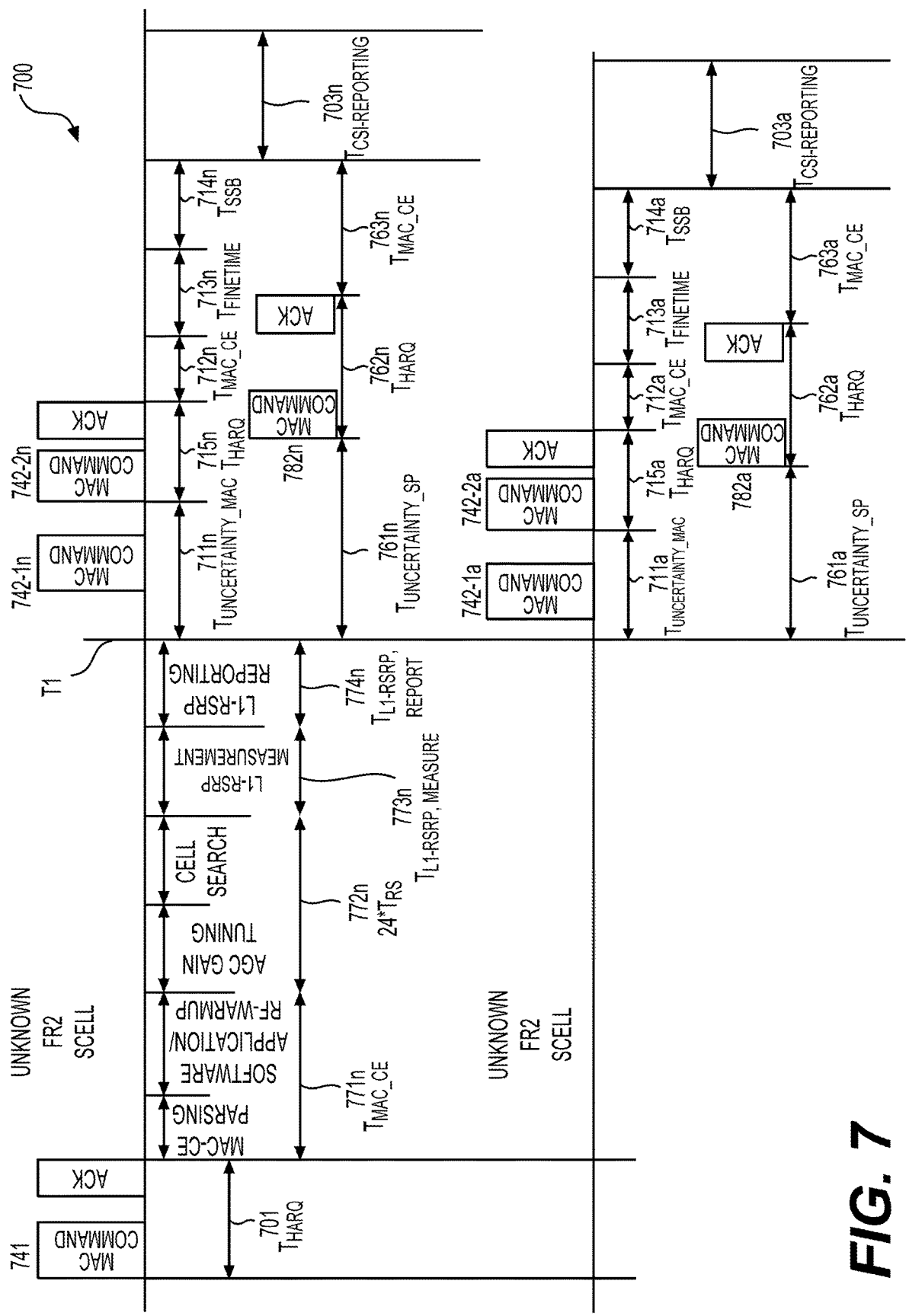
FIG. 7 shows another multi-SCell activation process 700 according to an embodiment of the disclosure.

FIG. 7 shows another multi-SCell activation process 700 according to an embodiment of the disclosure. During the process 700, similar to the process 600, one MAC CE command is received for activating two SCells operating in a same band in FR2. However, different from the process 600, both the two to-be-activated SCells are unknown. In addition, no active serving cells operate in the same FR2 band. The FIG. 1 example is used to explain the process 700. The two SCells can be a first SCell 120n and a second SCell 120a that are both unknown SCells.

As no active serving cell or known SCell in the same FR2 band is available, the base station 105 has no knowledge about qualities of Tx beams from the base station 105, and thus has no basis for determining TCI states for channels and RSs transmitted from the base station 105. In addition, the UE 101 cannot determine its frame timing based on a known SCell or active serving cell. Accordingly, the UE 101 can determine to perform AGC settling, cell search, and L1-RSRP measurement and report on one (e.g., SCell 120n) of the two intra-band FR2 SCells 120n and 120a. For the other SCell 120a, the UE 101 can hold the activation procedure until the L1-RSRP report process on the SCell 120n has been completed.

Thereafter, the SCell 120n becomes a known SCell. The SCells 120n and 120a can continue the activation process 700 in a way similar to the process 600 in the FIG. 6 example.

Specifically, as shown in FIG. 7, a MAC command 741 for activating both the SCells 120n and 120a is received and acknowledged during $T_{HARQ}$ 701, and processed and applied during $T_{MAC\_CE}$ 771n. Then, ACG settling and cell search are performed during a period 772n. As a result, in an example, AGC gain is adjusted for both the SCells 120n and 120a, and the RF module of SCells 120a is time/frequency synchronized to the SCell 120n. Thereafter, an L1-RSRP measurement and report process can be performed during the periods 773n-774n, and completed by the time T1.

After the time T1, activation processes for the SCells 120n and 120a can be carried out in parallel. The corresponding time periods 711n-715n, 761n-763n, 703n, 711a-715a, 761a-763a, and 703a are shown in FIG. 7.

In some examples, one MAC CE command is used to activate multiple inter-band FR2 SCells. The inter-band FR2

SCells may or may not be co-located. Timing or beam quality information of a known SCell may or may not be used for activating an unknown SCell.

Figure 8:
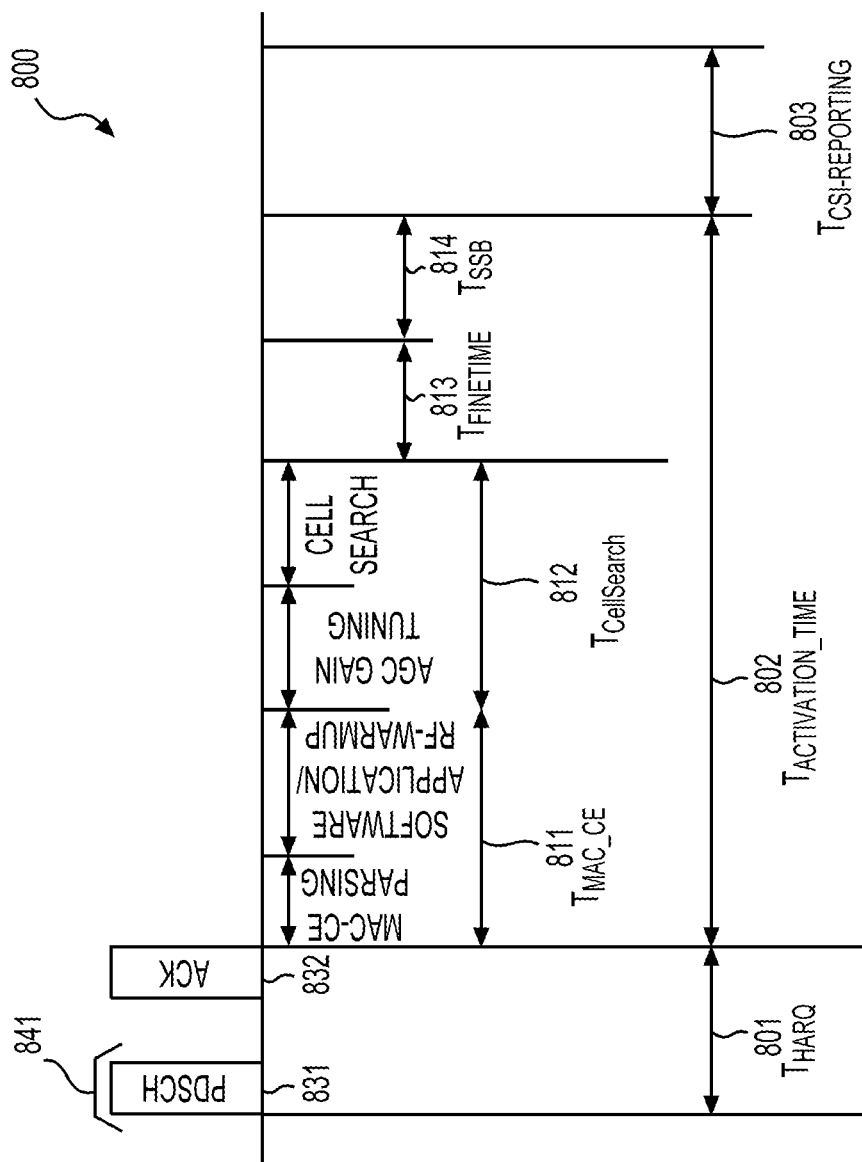
FIG. 8 shows a single SCell activation process 800 according to an embodiment of the disclosure.

FIG. 8 shows a single SCell activation process 800 according to an embodiment of the disclosure. The FIG. 1 example is used for explanation of the process 800. During the process 800, the SCell 120a is an unknown SCell operating on an FR1 band, and is to be activated. In addition, no known cell or active serving cell is available on the FR1 band. Thus, the SCell 120a has no other cells to rely on while being activated.

For example, whether an SCell in FR1 is known or unknown is defined as follows. An SCell in FR1 is known if the SCell meets the following conditions:
(i) During a certain period (e.g., equal to max (5*measCycleSCell, 5*DRX cycles) for FR1) before the reception of an SCell activation command, the UE has sent a valid measurement report for the SCell being activated and the SSB measured remains detectable according to certain cell identification conditions.
(ii) the SSB measured during the period equal to max (5*measCycleSCell, 5*DRX cycles) also remains detectable during the SCell activation delay according to the certain cell identification conditions.

Otherwise the SCell in FR1 is unknown.

As the to-be-activate SCell 120a operates in FR1, in some examples, beamforming is not employed. Under such a configuration, L-RSRP measurement and report for indicating beam qualities are not performed in the process 800. In addition, the TCI state indication scheme is not utilized, and thus there is no need to provide MAC CE commands for indicating TCI states for downlink control or data channels, or CSI-RS reception in the process 800. However, as the SCell 120a is an unknown SCell, AGC tuning, cell search, and time-frequency fine tuning are still performed.

Specifically, during the process 800, a PDSCH 831 carrying a MAC command 841 for activating the SCell 120a can be received at the U E 101 in the PCell 110. A HARQ ACK 832 can be transmitted from the UE 101 after $T_{HARQ}$ 801. During the period $T_{MAC\_CE}$ 811, a MAC CE parsing process can be performed to obtain the MAC command 841; and, accordingly, a software application and RF warm up process can be performed.

Thereafter, during the period $T_{CellSearch}$ 812, the UE 101 can wait for one or more SSB on the SCell 120a to perform AGC adjustment, and wait for another SSB to perform a time/frequency synchronization (cell detection). Subsequently, a fine time/frequency retuning can be performed during the period $T_{SSB}$ 814 after a first SSB is available in the SCell 120a at the end of the period $T_{FineTime}$ 813. After the fine time retuning operation, a CSI measurement and report process can be performed during the period $T_{CSI\_Reporting}$ 803. The CSI measurement can be based on SSB or CSI-RS.

As shown, a delay period incurred during the process 800, denoted $T_{activation\_time}$ 802, can be a sum of the periods 811-814. The process 800 can last for a period that is a sum of the periods 801-803.

Figure 9:
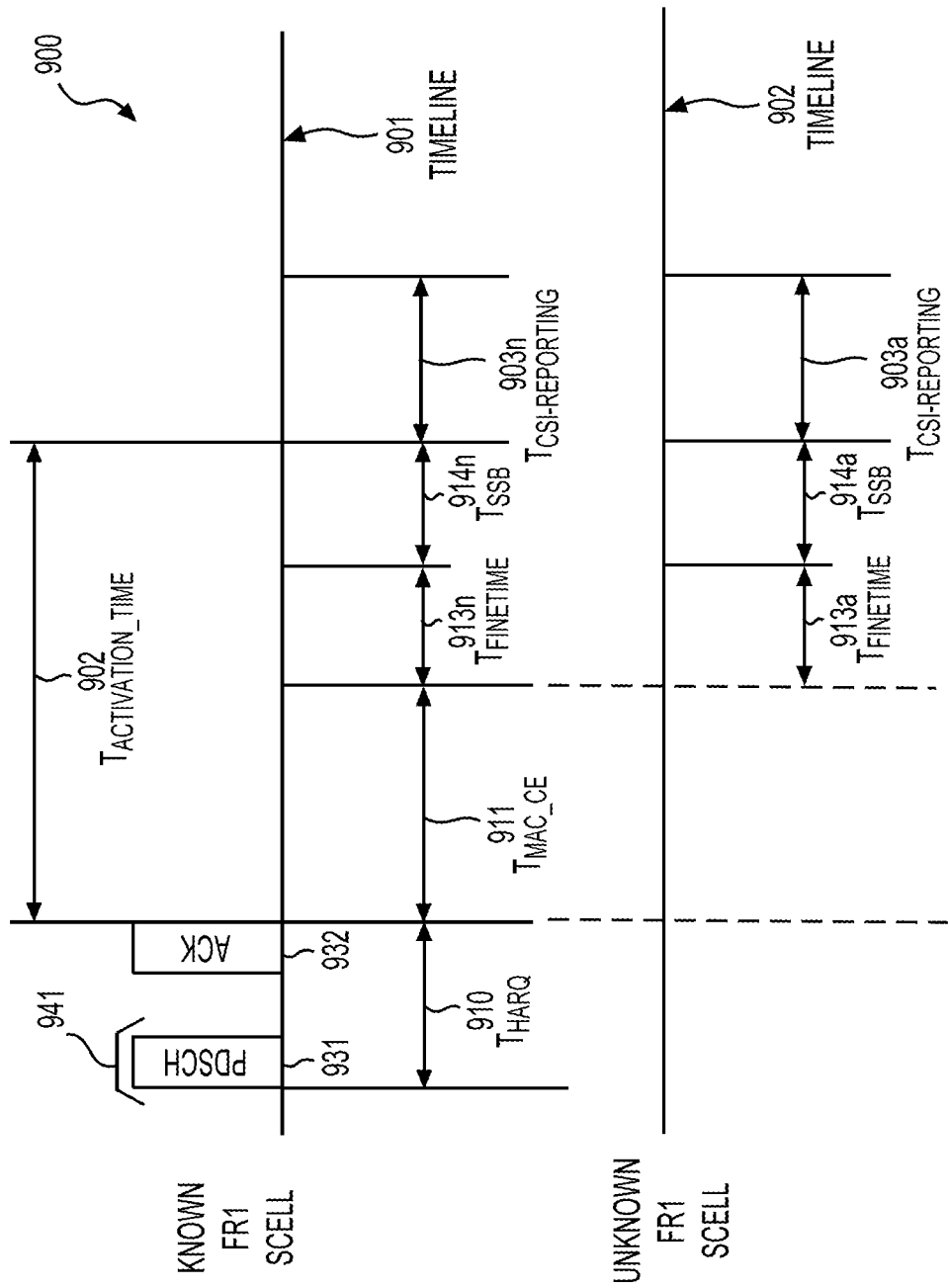
FIG. 9 shows a multi-SCell activation process 900 according to an embodiment of the disclosure.

FIG. 9 shows a multi-SCell activation process 900 according to an embodiment of the disclosure. Using the FIG. 1 example for explanation of the process 900, the multiple SCells to be activated in the process 900 can be a first SCell 120n that is known, and a second SCell 120a that is unknown. In addition, the two SCells 120a and 120n can be FR1 intra-band SCells operating in a same FR1 band. Further, no active serving cells are available in the same FR1 band.

As the SCell 120n is a known SCell, an AGC tuning and a cell search can have been performed recently. Accordingly, during the process 900, no AGC tuning or cell search is performed. Previously obtained parameters for AGC tuning or time/frequency synchronization (e.g., frame timing) can be reused.

For the SCell 120a that is unknown, assuming the SCell 120n is not available, AGC tuning and cell search would be performed during an activation process for activating the SCell 120a (similar to the process 800). As the known SCell operates in the same FR1 band as the unknown SCell 120a, the SCell 120a can rely on previously obtained information of the known SCell 120n to expedite its activation process.

For example, a same RF circuit (e.g., an amplifier) can be shared by the SCells 120n and 120a, and AGC tuning can be done for the SCells 120n and 120a at the same time. For another example, as the SCells 120n and 120a are in the same FR1 band, an MRTD can be configured to be within a predefined range (e.g., 260 ns). The unknown SCell 120a can thus determine its frame timing based on frame timing of the known SCell 120n, and use this timing as basis to perform a fine time/frequency tuning.

Specifically, during the process 900, a PDSCH 931 can be received at the UE 101 which carries a MAC CE command 941. After a delay of $T_{HARQ}$ 910, a HARQ ACK 932 can be fed back to the base station 105. Then, during a period of $T_{MAC\_CE}$ 911, a MAC CE carried in the PDSCH 931 can be parsed at MAC layer to obtain the MAC CE command 941. The MAC CE command 941 may indicate cell IDs of the SCells 120n and 120a. Also during the period of $T_{MAC\_CE}$ 911, an RF module warming up process can be performed. The respective RF module can be adjusted for reception on both the SCells 120n and 120a.

Thereafter, similar activation processes on the SCells 120n and 120a can be performed in parallel on the timelines 901 and 902, respectively, as shown in FIG. 9. For example, for the SCell 120n, the UE 101 can wait for a first available SSB during the period $T_{FineTime}$ 913n, and perform fine time tuning during the period $T_{SSB}$ 914n. After the fine time tuning, a CSI measurement and reporting process can be performed during the period $T_{CSI\_reporting}$ 903n.

In a similar way, the UE 101 may perform respective operations during the periods 913a, 914a, and 903a to complete the activation process of the SCell 120a. As shown, an activation delay, $T_{activation\_time}$, 902, can be a sum of the periods 911, 913n, and 914n for the SCell 120n, or a sum of the periods 911, 913a, and 914a for the SCell 120a.

Figure 10:
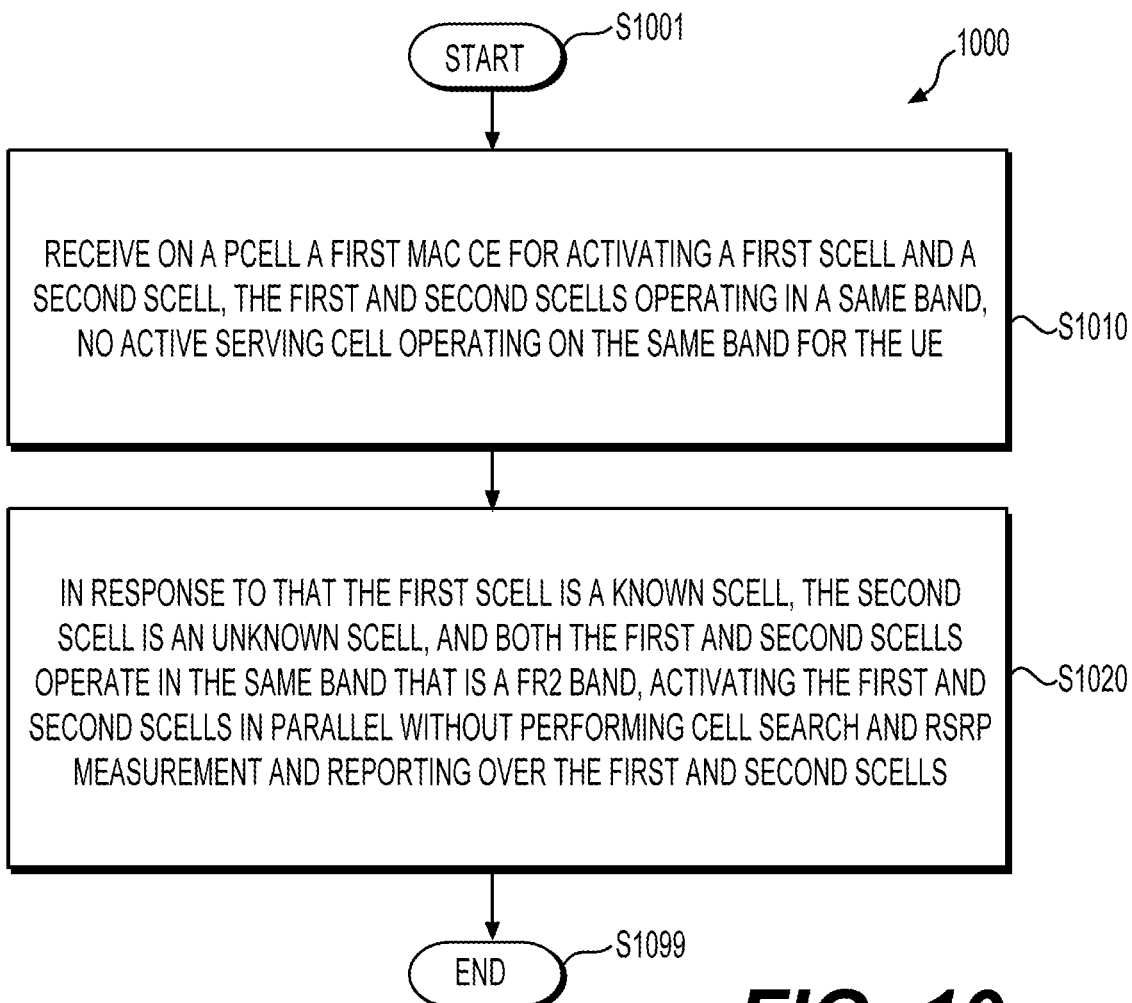
FIG. 10 shows a multi-SCell activation process 1000 according to embodiments of the disclosure.

FIG. 10 shows a multi-SCell activation process 1000 according to embodiments of the disclosure. The process 1000 can start from S1001, and proceed to S1010.

At S1010, a first MAC CE can be received on a PCell at a UE for activating a first SCell and a second SCell for the UE in a wireless communication system. For example, the MAC CE can included a MAC CE command indicating identities of the first and second SCells. The first and second SCells can operate in a same band (e.g., a FR2 band or a FR1 band). No active serving cell operates on the same band for the UE.

At S1020, in response to that the first SCell is a known SCell, the second SCell is an unknown SCell, and both the first and second SCells operate in the same band that is a FR2 band, the first and second SCells can be activated in parallel without performing cell search and RSRP measurement and reporting over the first and second SCells.

For example, the UE can determine whether the first SCell is a known SCell, or the second SCell is an unknown SCell based on historic operations performed on the first or second SCells. The UE can determine whether the first and second SCells operate in the same FR2 band based on related configurations. Accordingly, in response to the first SCell being known, the UE can determine to activate the unknown second SCell without performing the cell search or RSRP measurement and reporting operations. In this way, activation of the unknown second SCell can be expedited. The process 1000 can proceed to S1099, and terminate at S1099.

Figure 11:
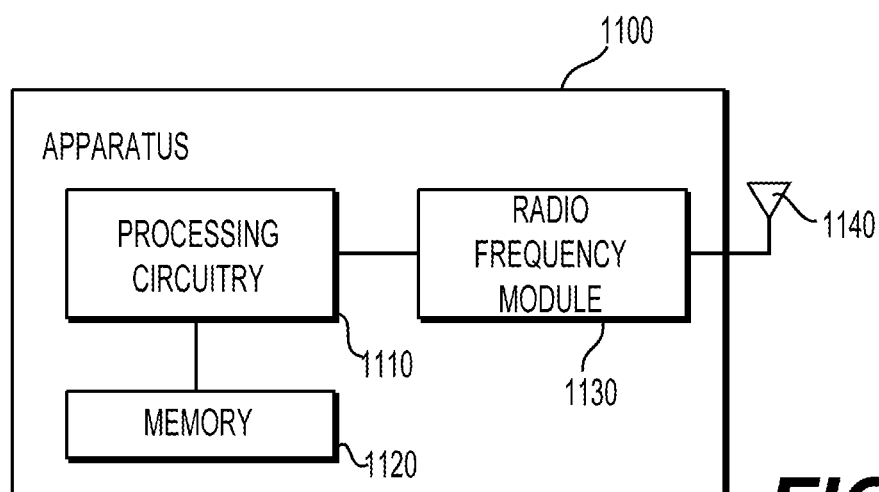
FIG. 11 shows an apparatus 1100 according to embodiments of the disclosure.

FIG. 11 shows an apparatus 1100 according to embodiments of the disclosure. The apparatus 1100 can be configured to perform various functions in accordance with one or more embodiments or examples described herein. Thus, the apparatus 1100 can provide means for implementation of mechanisms, techniques, processes, functions, components, systems described herein. For example, the apparatus 1100 can be used to implement functions of UEs or base stations in various embodiments and examples described herein. The apparatus 1100 can include a general purpose processor or specially designed circuits to implement various functions, components, or processes described herein in various embodiments. The apparatus 1100 can include processing circuitry 1110, a memory 1120, and a radio frequency (RF) module 1130.

In various examples, the processing circuitry 1110 can include circuitry configured to perform the functions and processes described herein in combination with software or without software. In various examples, the processing circuitry 1110 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1110 can be a central processing unit (CPU) configured to execute program instructions to perform various functions and processes described herein. Accordingly, the memory 1120 can be configured to store program instructions. The processing circuitry 1110, when executing the program instructions, can perform the functions and processes. The memory 1120 can further store other programs or data, such as operating systems, application programs, and the like. The memory 1120 can include non-transitory storage media, such as a read only memory (ROM), a random access memory (RAM), a flash memory, a solid state memory, a hard disk drive, an optical disk drive, and the like.

In an embodiment, the RF module 1130 receives a processed data signal from the processing circuitry 1110 and converts the data signal to beamforming wireless signals that are then transmitted via antenna arrays 1140, or vice versa. The RF module 1130 can include a digital to analog converter (DAC), an analog to digital converter (ADC), a frequency up converter, a frequency down converter, filters and amplifiers for reception and transmission operations. The RF module 1130 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1140 can include one or more antenna arrays.

The apparatus 1100 can optionally include other components, such as input and output devices, additional or signal processing circuitry, and the like. Accordingly, the apparatus 1100 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving on a primary cell (PCell) at a user equipment (UE) a first medium access (MAC) control element (CE) for activating a first secondary cell (SCell) and a second SCell for the UE from a base station in a wireless communication system, the first and second SCells operating in a same band, no active serving cell operating on the same band for the UE; and
activating the first and second SCells in parallel without performing cell search and reference signal received power (RSRP) measurement and reporting over the first and second SCells, in response to having the first SCell as a known SCell, the second SCell as an unknown SCell, and both the first and second SCells operating in the same band that is a frequency range 2 (FR2) band, wherein
the first SCell is the known SCell when the UE has transmitted an RSRP measurement report of the first SCell to the base station, and an interval between sending the RSRP measurement report and the receiving of the first MAC CE is shorter than a predefined time,
the activating the first and second SCells in parallel includes:
receiving on the PCell a second MAC CE for indicating a first transmission configuration indication (TCI)

state for receiving one of a physical downlink control channel (PDCCH) or a physical downlink shared channel (PDSCH) of the second SCell;

performing a time-frequency tracking process on the second SCell based on an SSB indicated in the first TCI state; and in response to receiving a third MAC CE on the PCell for activating a semi-persistent (SP) channel state information reference signal (CSI-RS) resource set of the second SCell, performing a channel state information (CSI) reporting process based on the SP CSI-RS resource set activated by the third MAC CE on the second SCell, and the first MAC CE for activating the first and second SCells is received in slot n, and a CSI report of the CSI reporting process based on the SP CSI-RS resource set activated by the third MAC CE on the second SCell is transmitted no later than in slot $$n + \frac{T_{HARQ} + T_{activation\_time} + T_{CSI\_reporting}}{\text{New Radio } (NR) \text{ slot length}},$$

where:

$T_{HARQ}$ denotes a delay between a downlink data transmission associated with the first MAC CE and a corresponding hybrid automatic repeat request (HARQ) acknowledgement, $T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and $T_{activation\_time}$ denotes an activation delay that is $$T_{MAC\_CE} + \max(T_{uncertainty\_MAC} + T_{FineTime} + T_{SSB}, T_{uncertainty\_SP}),$$

where, $T_{MAC\_CE}$ denotes a delay including MAC CE parsing and applying time, $T_{uncertainty\_MAC}$ denotes a period between a reception of the first MAC CE and a reception of a last one of the second MAC CE and a fourth MAC CE, wherein the fourth MAC CE indicates a second TCI state for receiving another one of the PDCCH and the PDSCH of the second SCell, $T_{FineTime}$ denotes a period between the UE completing processing of the last one of the second MAC CE and the fourth MAC CE, and a timing of the SSB indicated in the first TCI state, $T_{SSB}$ denotes a period for processing a received signal of the SSB indicated in the first TCI state, and $T_{uncertainty\_SP}$ denotes a period between the reception of the first MAC CE and a reception of the third MAC CE.

2. The method of claim 1, wherein $T_{activation\_time}$ is 3 ms+max($T_{uncertainty\_MAC}+T_{FineTime}$+2 ms, $T_{uncertainty\_SP}$).

3. The method of claim 1, wherein the activating the first and second SCells in parallel includes:

in response to receiving on the PCell a radio resource control (RRC) message for configuring periodic CSI-RS of the second SCell, performing a CSI reporting process based on the periodic SP CSI-RS configured by the RRC message on the second SCell.

4. The method of claim 3, wherein the first MAC CE for activating the SCell is received in slot n, and a CSI report of the CSI reporting process based on the periodic SP CSI-RS of the second SCell is transmitted no later than in slot $$n + \frac{T_{HARQ} + T_{activation\_time} + T_{CSI\_reporting}}{\text{New Radio } (NR) \text{ slot length}},$$

where:

$T_{HARQ}$ denotes a delay between a downlink data transmission associated with the first MAC CE and a corresponding HARQ acknowledgement, $T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and $T_{activation\_time}$ denotes an activation delay that is $$\max(T_{MAC\_CE}+T_{uncertainty\_MAC}+T_{FineTime}+T_{SSB}, T_{uncertainty\_RRC}+T_{RRC\_delay}-T_{HARQ}),$$

where, $T_{MAC\_CE}$ denotes a delay including MAC CE parsing and applying time, $T_{uncertainty\_MAC}$ denotes a period between a reception of the first MAC CE and a reception of a last one of the second MAC CE and a fourth MAC CE, wherein the fourth MAC CE indicates a second TCI state for receiving another one of the PDCCH and the PDSCH of the second SCell, $T_{FineTime}$ denotes a period between the UE completing processing of the last one of the second MAC CE and the fourth MAC CE, and a timing of the SSB indicated in the first TCI state, $T_{SSB}$ denotes a period for processing a received signal of the SSB indicated in the first TCI state, $T_{uncertainty\_RRC}$ denotes a period between the reception of the first MAC CE and a reception of the RRC message, and $T_{RRC\_delay}$ denotes a period for processing the RRC message.

5. The method of claim 4, wherein $T_{activation\_time}$ is $$\max(T_{uncertainty\_MAC}+5 \text{ ms}+T_{FineTime}, T_{uncertainty\_RRC}+T_{RRC\_delay}-T_{HARQ}).$$

6. The method of claim 1, further comprising:

in response to that both the first and second SCells are unknown SCells and operate in the same band that is an FR2 band, performing a cell search on the first SCell;

transmitting an RSRP measurement report indicating RSRP measurements associated with an SSB of the first SCell; and activating the second SCell without performing cell search and RSRP measurement and reporting over the second SCell.

7. The method of claim 1, further comprising:

in response to that the first SCell is a known SCell, the second SCell is an unknown SCell, and both the first and second SCells operate in the same band that is a frequency range 1 (FR1) band, activating the first and second SCells in parallel without performing automatic gain control (AGC) gain settling and cell search over the first and second SCells.

8. The method of claim 1, wherein the PCell is a primary cell of a primary cell group (PCG), or a primary cell of a secondary cell group (SCG).

9. An apparatus, comprising circuitry configured to:
receive on a primary cell (PCell) at a user equipment (UE) a first medium access (MAC) control element (CE) for activating a first secondary cell (SCell) and a second SCell for the UE from a base station in a wireless communication system, the first and second SCells operating in a same band, no active serving cell operating on the same band for the UE; and
activate the first and second SCells in parallel without performing cell search and reference signal received power (RSRP) measurement and reporting over the first and second SCells, in response to having the first SCell as a known SCell, the second SCell as an unknown SCell, and both the first and second SCells operating in the same band that is a frequency range 2 (FR2) band, wherein
the first SCell is the known SCell when the UE has transmitted an RSRP measurement report of the first SCell to the base station, and an interval between sending the RSRP measurement report and the receiving of the first MAC CE is shorter than a predefined time,
the activating the first and second SCells in parallel includes:
receiving on the PCell a second MAC CE for indicating a first transmission configuration indication (TCI) state for receiving one of a physical downlink control channel (PDCCH) or a physical downlink shared channel (PDSCH) of the second SCell;
performing a time-frequency tracking process on the second SCell based on an SSB indicated in the first TCI state; and
in response to receiving a third MAC CE on the PCell for activating a semi-persistent (SP) channel state information reference signal (CSI-RS) resource set of the second SCell, performing a channel state information (CSI) reporting process based on the SP CSI-RS resource set activated by the third MAC CE on the second SCell, and
the first MAC CE for activating the first and second SCells is received in slot n, and a CSI report of the CSI reporting process based on the SP CSI-RS resource set activated by the third MAC CE on the second SCell is transmitted no later than in slot $$n + \frac{T_{HARQ} + T_{activation\_time} + T_{CSI\_reporting}}{\text{New Radio (NR) slot length}},$$

where:
$T_{HARQ}$ denotes a delay between a downlink data transmission associated with the first MAC CE and a corresponding hybrid automatic repeat request (HARQ) acknowledgement,
$T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and
$T_{activation\_time}$ denotes an activation delay that is $$T_{MAC\_CE} + \max(T_{uncertainty\_MAC} + T_{FineTime} + T_{SSB}, T_{uncertainty\_SP}),$$

where,
$T_{MAC\_CE}$ denotes a delay including MAC CE parsing and applying time, $T_{uncertainty\_MAC}$ denotes a period between a reception of the first MAC CE and a reception of a last one of the second MAC CE and a fourth MAC CE, wherein the fourth MAC CE indicates a second TCI state for receiving another one of the PDCCH and the PDSCH of the second SCell,
$T_{FineTime}$ denotes a period between the UE completing processing of the last one of the second MAC CE and the fourth MAC CE, and a timing of the SSB indicated in the first TCI state,
$T_{SSB}$ denotes a period for processing a received signal of the SSB indicated in the first TCI state, and
$T_{uncertainty\_SP}$ denotes a period between the reception of the first MAC CE and a reception of the third MAC CE.

10. The apparatus of claim 9, wherein $T_{activation\_time}$ is $$3 \text{ ms} + \max(T_{uncertainty\_MAC} + T_{FineTime} + 2 \text{ ms}, T_{uncertainty\_SP}).$$

11. The apparatus of claim 9, wherein the circuitry is further configured to:
in response to receiving on the PCell a radio resource control (RRC) message for configuring periodic CSI-RS of the second SCell, perform a channel state information (CSI) reporting process based on the periodic SP CSI-RS configured by the RRC message on the second SCell.

12. The apparatus of claim 11, wherein the first MAC CE for activating the SCell is received in slot n, and a CSI report of the CSI reporting process based on the periodic SP CSI-RS configured by the RRC message on the second SCell is transmitted no later than in slot $$n + \frac{T_{HARQ} + T_{activation\_time} + T_{CSI\_reporting}}{\text{New Radio (NR) slot length}},$$

where:
$T_{HARQ}$ denotes a delay between a downlink data transmission associated with the first MAC CE and a corresponding hybrid automatic repeat request (HARQ) acknowledgement,
$T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and
$T_{activation\_time}$ denotes an activation delay that is $$\max(T_{MAC\_CE} + T_{uncertainty\_MAC} + T_{FineTime} + T_{SSB}, T_{uncertainty\_RRC} + T_{RRC\_delay} - T_{HARQ}),$$

where,
$T_{MAC\_CE}$ denotes a delay including MAC CE parsing and applying time,
$T_{uncertainty\_MAC}$ denotes a period between a reception of the first MAC CE and a reception of a last one of the second MAC CE and a fourth MAC CE, wherein the fourth MAC CE indicates a TCI state for receiving the other one of the PDCCH and the PDSCH of the second SCell,
$T_{FineTime}$ denotes a period between the UE completing processing of the last one of the second MAC CE and the fourth MAC CE, and a timing of the SSB indicated in the first TCI state,
$T_{SSB}$ denotes a period for processing a received signal of the SSB indicated in the first TCI state, $T_{uncertainty\_RRC}$ denotes a period between the reception of the first MAC CE and a reception of the RRC message, and $T_{RRC\_delay}$ denotes a period for processing the RRC message.

13. The apparatus of claim 12, wherein $T_{activation\_time}$ is $\max(T_{uncertainty\_MAC}+5\ \text{ms}+T_{FineTime},T_{uncertainty\_RRC}+T_{RRC\_delay}-T_{HARQ})$.

14. The apparatus of claim 9, wherein the circuitry is further configured to:
   in response to that both the first and second SCells are unknown SCells and operate in the same band that is an FR2 band,
      perform a cell search on the first SCell;
      transmit an RSRP measurement report indicating RSRP measurements associated with an SSB of the first SCell; and
      activate the second SCell without performing cell search and RSRP measurement and reporting over the second SCell.

15. The apparatus of claim 9, wherein the circuitry is further configured to:
   in response to that the first SCell is a known SCell, the second SCell is an unknown SCell, and both the first and second SCells operate in the same band that is a frequency range 1 (FR1) band, activate the first and second SCells in parallel without performing automatic gain control (AGC) gain settling and cell search over the first and second SCells.

16. A non-transitory computer-readable medium storing instructions that, when executed by a processor, cause the processor to perform a method, the method comprising:
   receiving on a primary cell (PCell) at a user equipment (UE) a first medium access (MAC) control element (CE) for activating a first secondary cell (SCell) and a second SCell for the UE from a base station in a wireless communication system, the first and second SCells operating in a same band, no active serving cell operating on the same band for the UE; and
   activating the first and second SCells in parallel without performing cell search and reference signal received power (RSRP) measurement and reporting over the first and second SCells, in response to having the first SCell as a known SCell, the second SCell as an unknown SCell, and both the first and second SCells operating in the same band that is a frequency range 2 (FR2) band
   wherein
   the first SCell is the known SCell when the UE has transmitted an RSRP measurement report of the first SCell to the base station, and an interval between sending the RSRP measurement report and the receiving of the first MAC CE is shorter than a predefined time,
   the activating the first and second SCells in parallel includes:
      receiving on the PCell a second MAC CE for indicating a first transmission configuration indication (TCI) state for receiving one of a physical downlink control channel (PDCCH) or a physical downlink shared channel (PDSCH) of the second SCell;
      performing a time-frequency tracking process on the second SCell based on an SSB indicated in the first TCI state; and
      in response to receiving a third MAC CE on the PCell for activating a semi-persistent (SP) channel state information reference signal (CSI-RS) resource set of the second SCell, performing a channel state information (CSI) reporting process based on the SP CSI-RS resource set activated by the third MAC CE on the second SCell, and
   the first MAC CE for activating the first and second SCells is received in slot n, and a CSI report of the CSI reporting process based on the SP CSI-RS resource set activated by the third MAC CE on the second SCell is transmitted no later than in slot $$n + \frac{T_{HARQ} + T_{activation\_time} + T_{CSI\_reporting}}{\text{New Radio (NR) slot length}},$$

where:
   $T_{HARQ}$ denotes a delay between a downlink data transmission associated with the first MAC CE and a corresponding hybrid automatic repeat request (HARQ) acknowledgement,
   $T_{CSI\_reporting}$ denotes a delay including an uncertainty period in acquiring a first available downlink CSI resource during the CSI reporting process, processing time for the CSI report, and an uncertainty period in acquiring a first available CSI reporting resource, and
   $T_{activation\_time}$ denotes an activation delay that is $T_{MAC\_CE}+\max(T_{uncertainty\_MAC}+T_{FineTime}+T_{SSB}, T_{uncertainty\_SP})$, where
   $T_{MAC\_CE}$ denotes a delay including MAC CE parsing and applying time,
   $T_{uncertainty\_MAC}$ denotes a period between a reception of the first MAC CE and a reception of a last one of the second MAC CE and a fourth MAC CE, wherein the fourth MAC CE indicates a second TCI state for receiving another one of the PDCCH and the PDSCH of the second SCell,
   $T_{FineTime}$ denotes a period between the UE completing processing of the last one of the second MAC CE and the fourth MAC CE, and a timing of the SSB indicated in the first TCI state,
   $T_{SSB}$ denotes a period for processing a received signal of the SSB indicated in the first TCI state, and
   $T_{uncertainty\_SP}$ denotes a period between the reception of the first MAC CE and a reception of the third MAC CE.

* * * * *